US012631161B2

(12) United States Patent
    Kanner et al.

(10) Patent No.: US 12,631,161 B2
(45) Date of Patent: May 19, 2026

(54) FLOATING WIND TURBINE SYSTEMS AND METHODS

(71) Applicant: Aikido Technologies, Inc., San Francisco, CA (US)

(72) Inventors: Sam Kanner, San Francisco, CA (US); Bingbin Yu, San Francisco, CA (US); James Reeves, San Francisco, CA (US)

(73) Assignee: Aikido Technologies, Inc., San Francisco, CA (US)

( * ) Notice: Subject to any disclaimer, the term of this patent is extended or adjusted under 35 U.S.C. 154(b) by 177 days.

(21) Appl. No.: 17/981,289

(22) Filed: Nov. 4, 2022

(65) Prior Publication Data

US 2023/0141340 A1      May 11, 2023

Related U.S. Application Data

(60) Provisional application No. 63/276,082, filed on Nov. 5, 2021, provisional application No. 63/276,086, filed on Nov. 5, 2021.

(51) Int. Cl.
    F03D 13/25 (2016.01)
    B63B 35/44 (2006.01)
    (Continued)

(52) U.S. Cl.
    CPC .............. F03D 7/048 (2013.01); B63B 35/44 (2013.01); B63B 43/06 (2013.01); F03D 7/0224 (2013.01);
    (Continued)

(58) Field of Classification Search
    CPC ...... F03D 13/25; F03D 7/0224; F03D 7/0204; F05B 2240/93; F05B 2240/95; B63B 2035/446
    See application file for complete search history.

(56) References Cited

U.S. PATENT DOCUMENTS 4,565,929 A      1/1986  Baskin et al.
7,612,462 B2 *  11/2009  Viterna ................... F03D 13/10
                                                          290/55
(Continued)

FOREIGN PATENT DOCUMENTS

FR        3022880 A1 *  1/2016  ............. B63B 21/50
GB        2344843 A     6/2000
(Continued)

OTHER PUBLICATIONS

International Search Report and Written Opinion mailed Mar. 16, 2023, Patent Application No. PCT/US2022/079338, 16 pages.
(Continued)

*Primary Examiner* — Justin D Seabe
(74) *Attorney, Agent, or Firm* — Stephen J. Kenny; Nicole A. Bustos-Pomerantz; Foley Hoag LLP

(57) ABSTRACT

A method of operating a downwind floating wind turbine comprising the downwind floating wind turbine floating in a body of water assuming mean heel angle within a range, the mean heel angle defined by a mean pitch angle of a central axis Y of a tower of the downwind floating wind turbine in a direction of wind; and the downwind floating wind turbine operating with a maximum rotor misalignment from a horizontal axis that is perpendicular to gravity while assuming the mean heel angle. The tower includes a turbine with a nacelle, hub and a plurality of blades extending from the hub, the plurality of blades configured to rotate about a rotor axis R, the rotor axis R having rotor tilt angle defined by an angle of rotor axis R relative to a perpendicular axis to the central axis Y.

17 Claims, 18 Drawing Sheets

(51) Int. Cl.

| | | |
|---|---|---|
| *B63B 43/06* | (2006.01) |
| *F03D 7/02* | (2006.01) |
| *F03D 7/04* | (2006.01) |
| *B63B 39/03* | (2006.01) |

(52) U.S. Cl.

CPC ........ *F03D 13/25* (2016.05); *B63B 2035/446* (2013.01); *B63B 39/03* (2013.01); *F05B 2240/93* (2013.01); *F05B 2240/95* (2013.01); *F05B 2270/18* (2013.01)

(56) References Cited

U.S. PATENT DOCUMENTS

| | | | | |
|---|---|---|---|---|
| 9,938,960 | B2 * | 4/2018 | Gabeiras | F03D 13/25 |
| 10,677,224 | B2 * | 6/2020 | Cruse | B63B 1/107 |
| 2017/0175713 | A1 | 6/2017 | Barber | |
| 2020/0010155 | A1 | 1/2020 | Robinson et al. | |
| 2020/0354030 | A1 | 11/2020 | Bowie | |
| 2020/0378357 | A1 | 12/2020 | Louazel et al. | |
| 2021/0146307 | A1 | 5/2021 | Dehlsen | |
| 2023/0049381 | A1 * | 2/2023 | Aubault | B63B 43/06 |

FOREIGN PATENT DOCUMENTS

| | | | | |
|---|---|---|---|---|
| JP | 2012149531 | A | * | 8/2012 |
| JP | 2021-011124 | A | | 2/2021 |
| KR | 10-1588237 | B1 | | 1/2016 |
| WO | WO-2013/048257 | A1 | | 4/2013 |
| WO | 2014015878 | A1 | | 1/2014 |
| WO | 2020242807 | A1 | | 12/2020 |
| WO | 2021022250 | A1 | | 2/2021 |
| WO | 2021148156 | A1 | | 7/2021 |
| WO | WO-2023/081849 | A1 | | 5/2023 |

OTHER PUBLICATIONS

International Preliminary Report on Patentability for International Application No. PCT/US22/79338 dated May 16, 2024.

Nanos et al., "Vertical Wake Deflection for Floating Wind Turbines by Differential Ballast Control," European Academy of Wind Energy, Aug. 19, 2021, 30 pages.

Notice of Allowance for U.S. Appl. No. 17/981,150 dated Nov. 10, 2025.

Supplementary Partial European Search Report for EP Application No. 22891116.0 dated Sep. 11, 2025.

* cited by examiner

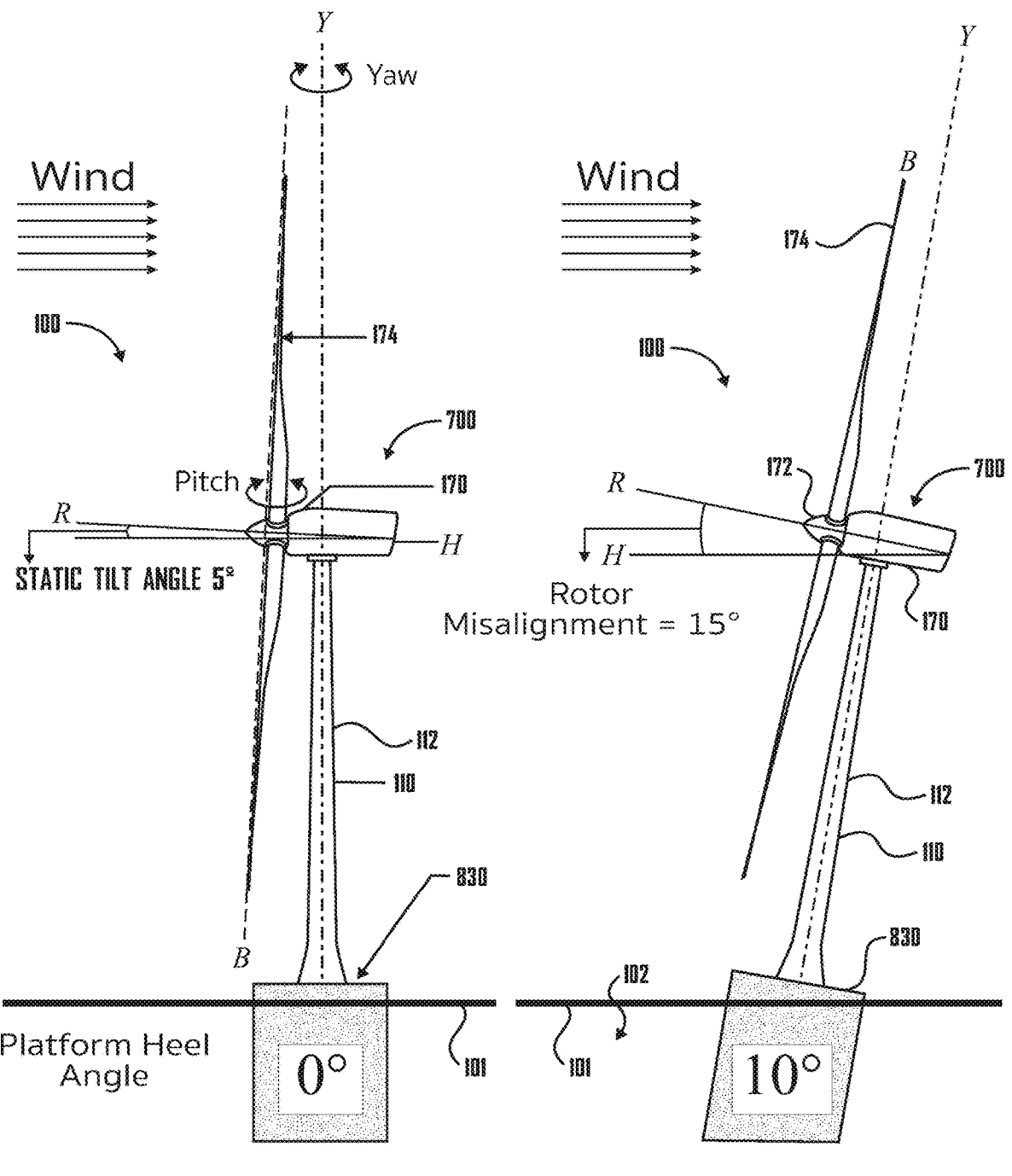
*Fig. 13a* *Fig. 13b*

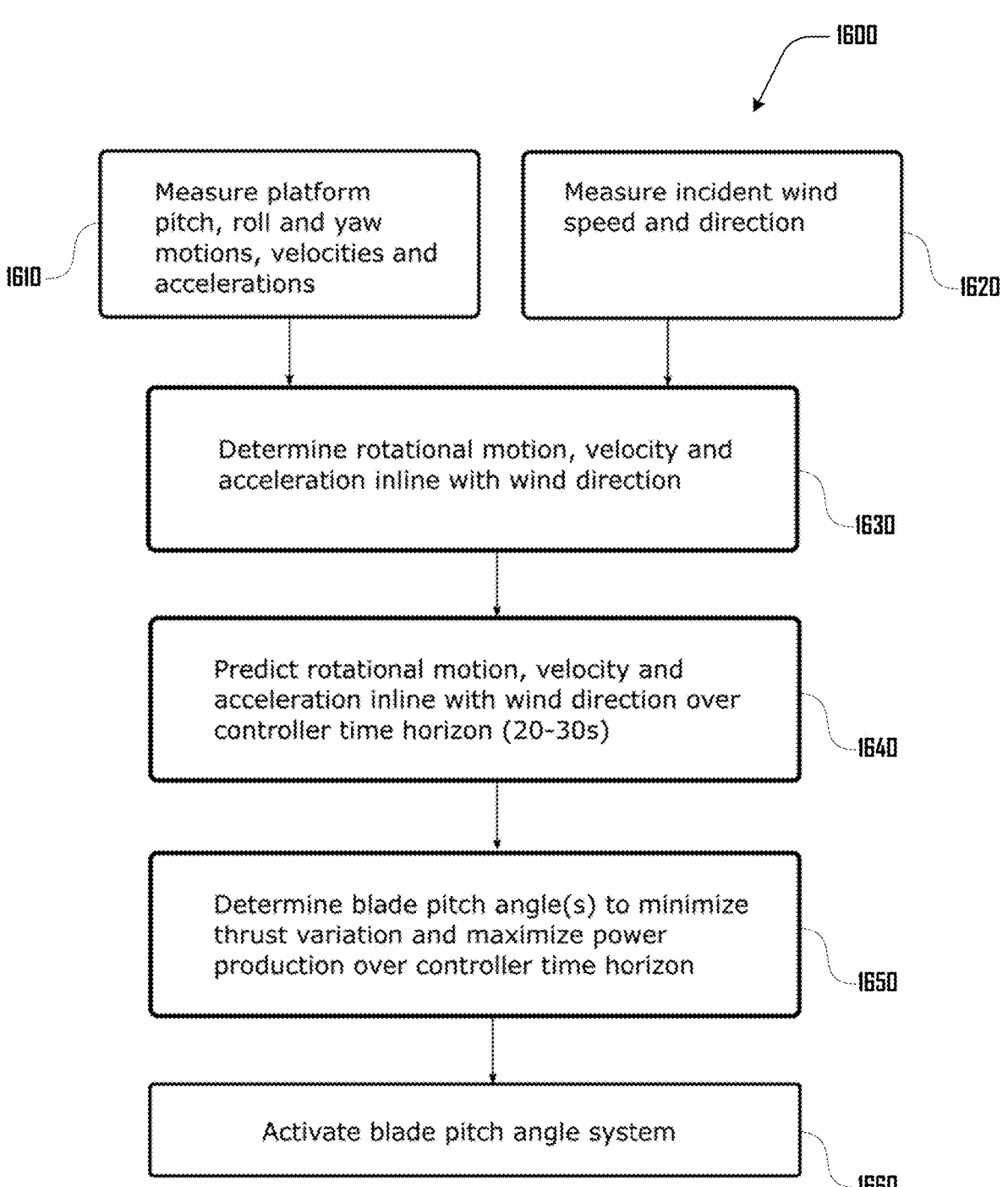

*1600*

Measure platform pitch, roll and yaw motions, velocities and accelerations — *1610*

Measure incident wind speed and direction — *1620*

Determine rotational motion, velocity and acceleration inline with wind direction — *1630*

Predict rotational motion, velocity and acceleration inline with wind direction over controller time horizon (20-30s) — *1640*

Determine blade pitch angle(s) to minimize thrust variation and maximize power production over controller time horizon — *1650*

Activate blade pitch angle system — *1660*

*Fig.16*

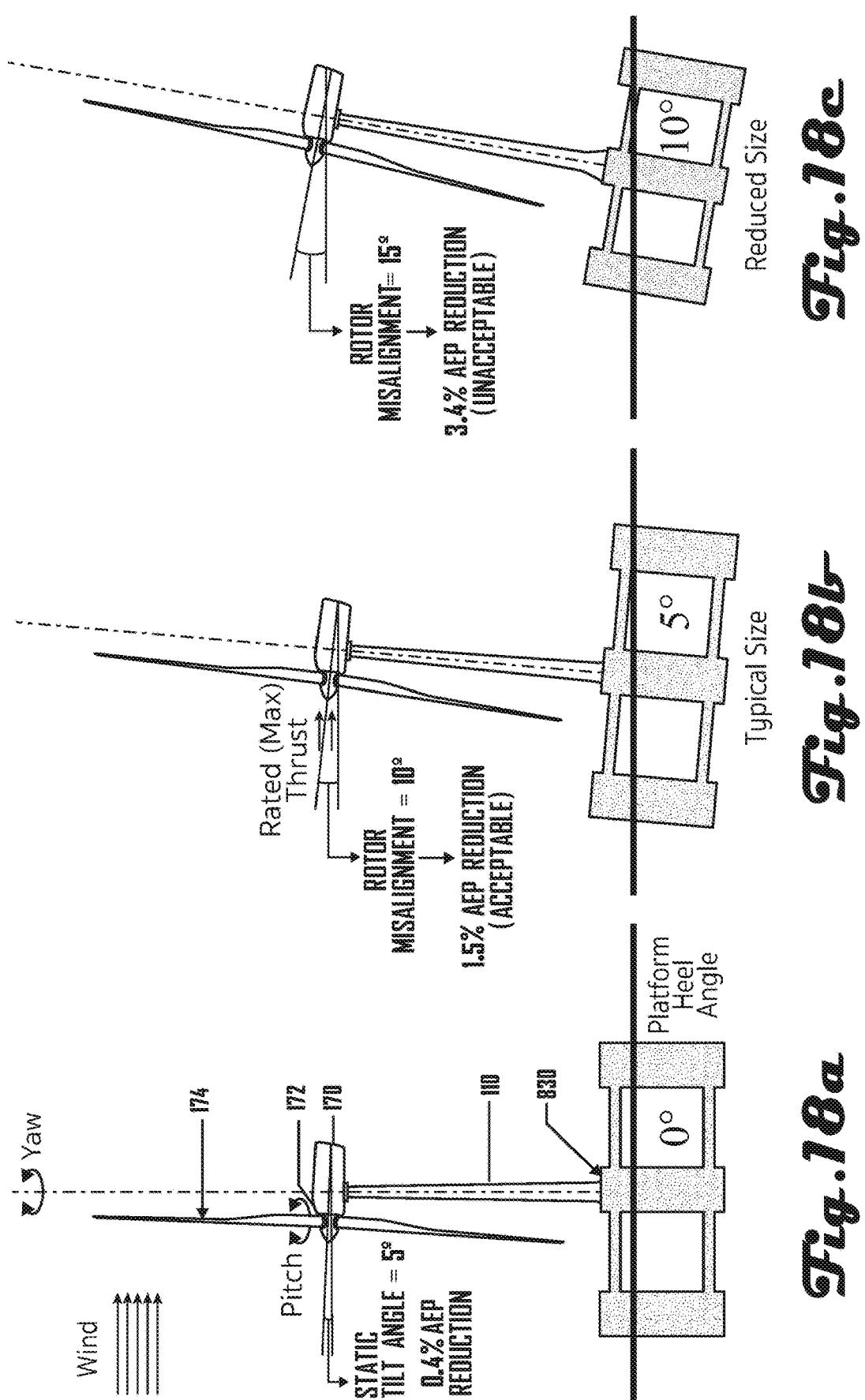

FLOATING WIND TURBINE SYSTEMS AND METHODS

CROSS-REFERENCE TO RELATED APPLICATIONS

This application is a non-provisional of and claims the benefit of U.S. Provisional Application No. 63/276,082, filed Nov. 5, 2021, entitled "SELF-UPENDING FLOATING WIND PLATFORM SYSTEMS AND METHODS." This application is hereby incorporated herein by reference in its entirety and for all purposes.

This application is a non-provisional of and claims the benefit of U.S. Provisional Application No. 63/276,086, filed Nov. 5, 2021, entitled "DOWNWIND FLOATING WIND TURBINE AND ITS CONTROL SYSTEM." This application is hereby incorporated herein by reference in its entirety and for all purposes.

BRIEF DESCRIPTION OF THE DRAWINGS

FIG. 1a is first side view of an example embodiment of a floating wind turbine.

FIG. 1b is a second side view of the example embodiment of the floating wind turbine of FIG. 1a.

FIG. 2a is first side view of another example embodiment of a floating wind turbine.

FIG. 2b is a second side view of the example embodiment of the floating wind turbine of FIG. 1a.

FIG. 13a illustrates an example of an upwind floating wind turbine where the central axis Y of the tower is at a heel angle of 0° with a rotor tilt angle of 5°.

FIG. 13b illustrates the upwind floating wind turbine of FIG. 13a at a heel angle of 10°.

FIG. 16 is a block diagram of a wind turbine controller method.

FIG. 18a illustrates an example embodiment of an upwind floating wind turbine under static conditions with a static tilt angle of 5° and a heel angle of 0°, which in this example causes an AEP reduction of 0.4% compared to a tilt angle of 0°.

FIG. 18b illustrates an example embodiment of a passive upwind floating wind turbine under rated thrust conditions with a static tilt angle of 5° at a heel angle of 5° that causes a rotor misalignment of 10°, which in this example causes an acceptable AEP reduction of 1.5% compared to a rotor misalignment of 0°.

FIG. 18c illustrates an example embodiment of a passive upwind floating wind turbine under rated thrust conditions with a static tilt angle of 5° at a heel angle of 100 that causes a rotor misalignment of 15°, which in this example causes an unacceptable AEP reduction of 3.4% compared to a rotor misalignment of 0°.

Figure 1:
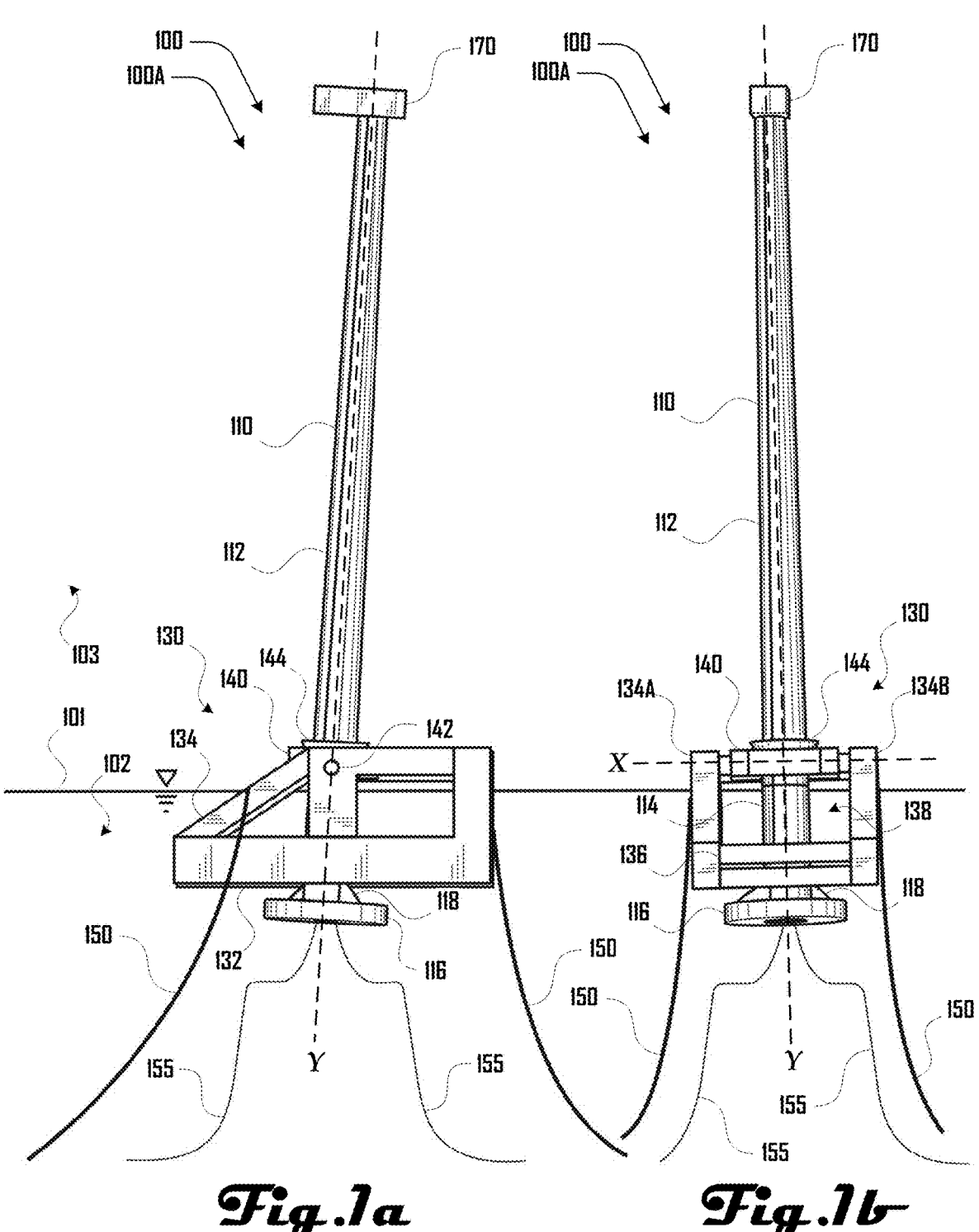

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

One advantage of deploying some embodiments of floating wind turbines offshore over bottom-fixed wind turbines can be that such floating wind turbines can be assembled and commissioned using onshore cranes and machinery and then towed out to site. However, the access to many ports around the world can be hindered by bridges or other obstacles (e.g., airport regulations) that can constrain the distance a structure rises from the sea level (known as the 'air draft'). Much of the world's existing infrastructure has been driven by the global shipping industry, which has standardized vessel classes (e.g., PANAMAX, CHINAMAX, etc.). Air draft allowances can be 50-70 m in some examples. Some wind turbines can have hub heights in excess of 100 m, rendering many large ports or shipyards inaccessible.

The present disclosure in one aspect provides systems and methods for accessing these ports by articulating the wind turbine to a horizontal position during transit. Once located in deeper waters, past the obstruction, the turbine can then be upended into an erected configuration. Furthermore, many ports can have draft restrictions that can be as low as 7 m-8 m. By transporting the turbine in a horizontal position, the wind turbine, the draft can be reduced in various embodiments.

Another benefit of some examples discussed herein can be to reduce loading on the wind turbine and floating hull structure in extreme wind or fault events. The turbine tower, in some embodiments, can be forced to articulate to a horizontal (or near horizontal) position either by strong winds or by the inclusion of a motor, actuator, or the like. When the turbine is in such a position, the loads on the turbine and the floating hull can be reduced. During a turbine fault event, the forces from the turbine may not be directly transferred to the hull in some examples. Instead, the energy can be dissipated through the viscous damping of the turbine sub-structure in various embodiments.

Current wind turbines can be robust on land and on fixed offshore wind platforms but their usage on floating platforms typically requires elaborate control systems or large platforms. These platform control systems are costly to install and difficult to maintain and operate as they require regular maintenance. In some wind turbines, the rotor is tilted upward by 4-8 degrees in order to increase the clearance between the blade tips and tower in operation. This angle relative to the horizontal is referred to as the shaft axis, as the main shaft of the wind turbine is from the generator or gearbox to the hub to transmit torque from the rotor.

A wind turbine described in various embodiments of the present disclosure includes a downwind turbine, where the rotor is oriented 4-8 degrees upward from the horizontal in order to increase the clearance between the blade tips and tower in operation. The wind turbine in various examples produces a thrust force in order to produce power from the wind. The thrust force can result in an overturning moment on the platform, which can cause the platform to have a mean heel angle. Here, a heel angle can be the mean pitch angle of the platform, in the direction of the wind.

In some examples of a floating wind platform, the target design heel angle is the heel angle of the platform when it is subject to the rated thrust force of the turbine. Generally, the rated thrust force is the maximum mean thrust force on the turbine during operation. The design heel angle of a platform can depend on the restoring force of the platform and mooring system, which can be a function of its center of gravity and buoyancy, its waterplane moment area of inertia and the restoring force due to the mooring system. In general, increasing the platform's hydrostatic stiffness can result in increased cost or complexity of the system, or both. For instance, for a conventional semi-submersible floating wind platform, the hydrostatic stiffness can be increased by increasing the spacing of the columns, increasing the size of the columns, or both. Wind platforms, without active platform control systems, can target a design heel angle of 4-5 degrees, so that that the maximum rotor misalignment is 8-13 degrees from the horizontal. In various embodiments, the power of the turbine is a function of the swept area of the rotor. The swept area decreases as function of the tilt angle of the turbine as function of the cosine of the tilt angle (gamma). Mathematically, $$P=0.5*rho*Cp*A*\cos(\text{gamma})*V^3$$

Where rho is air density, Cp is power coefficient, A is swept area of blades, gamma is tilt angle of turbine, V is velocity of wind.

Some embodiments include a floating, downwind fixed-hub turbine that passively operates at a mean heel angle. For example, to produce power thrust is produced, and such thrust can cause the platform to tilt (heel) over in the direction of the wind. By designing a floating wind turbine that has a mean heel angle of 10 degrees, for example, then in various embodiments you have the same rotor misalignment as an upwind turbine that is oriented vertically, such as one on land (+/−5 degrees). By designing a platform that has a mean heel angle of 15 degrees, for example, then you have the same rotor misalignment as an upwind turbine on a floating platform with a heel angle of 5 degrees.

Some embodiments include a floating, downwind teetered turbine that passively operates at a mean heel angle. By designing such floating wind turbine that has a mean heel angle of 15 deg, for example, in various embodiments you then can have less rotor misalignment than an upwind turbine that is oriented vertically (e.g., 0 deg vs+5 degrees).

Some wind platforms, with active platform control systems, can target a design heel angle of 5-8 degrees, so that the tower can remain vertical and the maximum rotor misalignment can be maintained at 4-8 degrees. Some wind turbines can have larger active control systems which can cause an increased tilt angle, resulting in 0 degrees rotor misalignment. However, a need exists for an improved floating-specific wind turbine and method for its control in an effort to overcome the aforementioned obstacles and deficiencies of some examples of wind turbine systems.

In various embodiments, a benefit of a tilting, downwind floating wind turbine operating at a tilt angle can be that the wake generated by the floating wind turbine can be driven down and have a reduced effect on the downstream floating wind turbine where a plurality of floating wind turbines are disposed in an array, group or farm. In various embodiments, this can allow more floating wind turbines to be packed into in a given area, which can be a large concern for floating wind turbine operators and other stakeholders (fishing, e.g.).

Below are described example systems and methods, that in accordance with some embodiments, can be used to design lighter, more inexpensive floating wind turbines including towers and supporting hull platforms. For example, various embodiments can include a floating wind turbine comprising one or more of:

(1) A one-, two- or three-bladed wind turbine (e.g., horizontal-axis: upwind or downwind rotor, or vertical-axis).

(2) A platform comprising of multiple, buoyant assemblies (e.g., 4 such assemblies). For example, in some embodiments the assemblies can comprise four-bar linkages using members connected by pin bearings or other suitable element. The assemblies in some examples contain a main buoyant member (e.g., a column). In one embodiment, each of the assemblies are connected to a central column.

(3) A moveable truss member for each assembly, such that each assembly can be reconfigured depending on the position of said truss member. In various examples, when the truss member is connected the final position of the assembly is determined. In one embodiment, the final position of the assembly is such that the column is oriented vertically.

Figure 8:
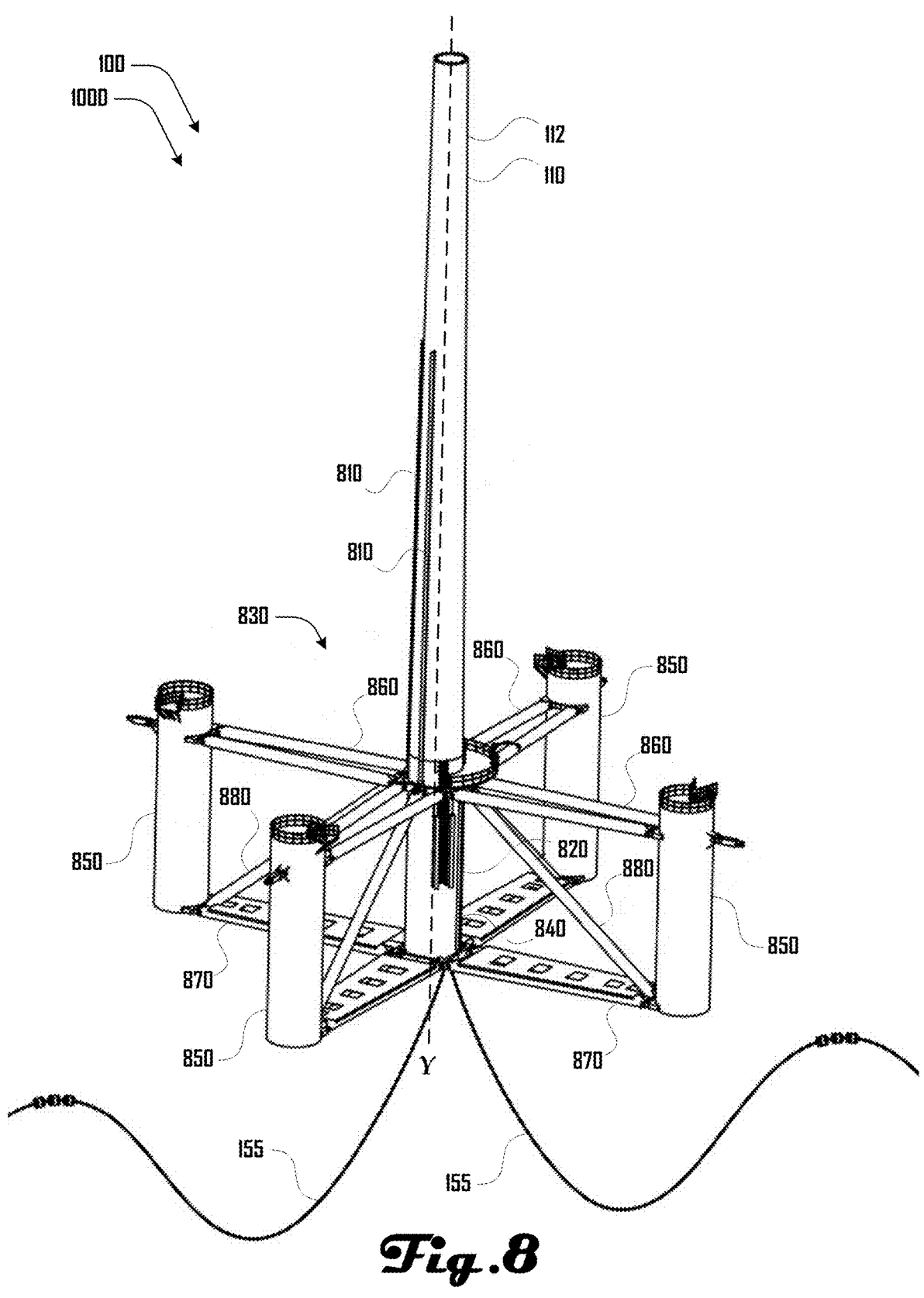
FIG. 8 illustrates an example embodiment of a self-upending floating wind turbine in an upright (e.g., operational) configuration.

One embodiment can be designed so that platform is as shown in FIG. 8. Such a design can comprise, consist essentially of, or consists of one or more of the following elements, with one or more of such elements being specifically absent in some embodiments.

(a) Multiple buoyant columns that can have a variable amount of mass (such as partially or fully filled ballast tanks).

(b) Multiple, independent assemblies, such that the horizontal members (e.g., the upper and lower truss members in FIG. 8) form a four-bar linkage with the central column and a buoyant structure (e.g., an outer column). Each of the structural members can connected by pin bearings in some examples.

(c) A diagonal cross-beam for one or more pinned structure.

(d) A mechanism to allow the end of the cross-beam to transit across the central column/tower.

One embodiment comprises, consists essentially of, or consists of a floating downwind turbine with a turbine control system that can be used to optimize the tilt angle of the platform.

Another embodiment comprises, consists essentially of, or consists of a floating downwind turbine with a teetered hub, and a turbine control system that can be used to optimize the teeter angle of the rotor and the tilt angle of the platform.

In some such embodiments, no active control system exists on the platform, as the platform can be allowed to passively pitch or tilt in the direction of the wind. However, in various examples, the turbine is able to produce full power, as the rotor plane can remain aligned with the horizontal.

Figure 2:
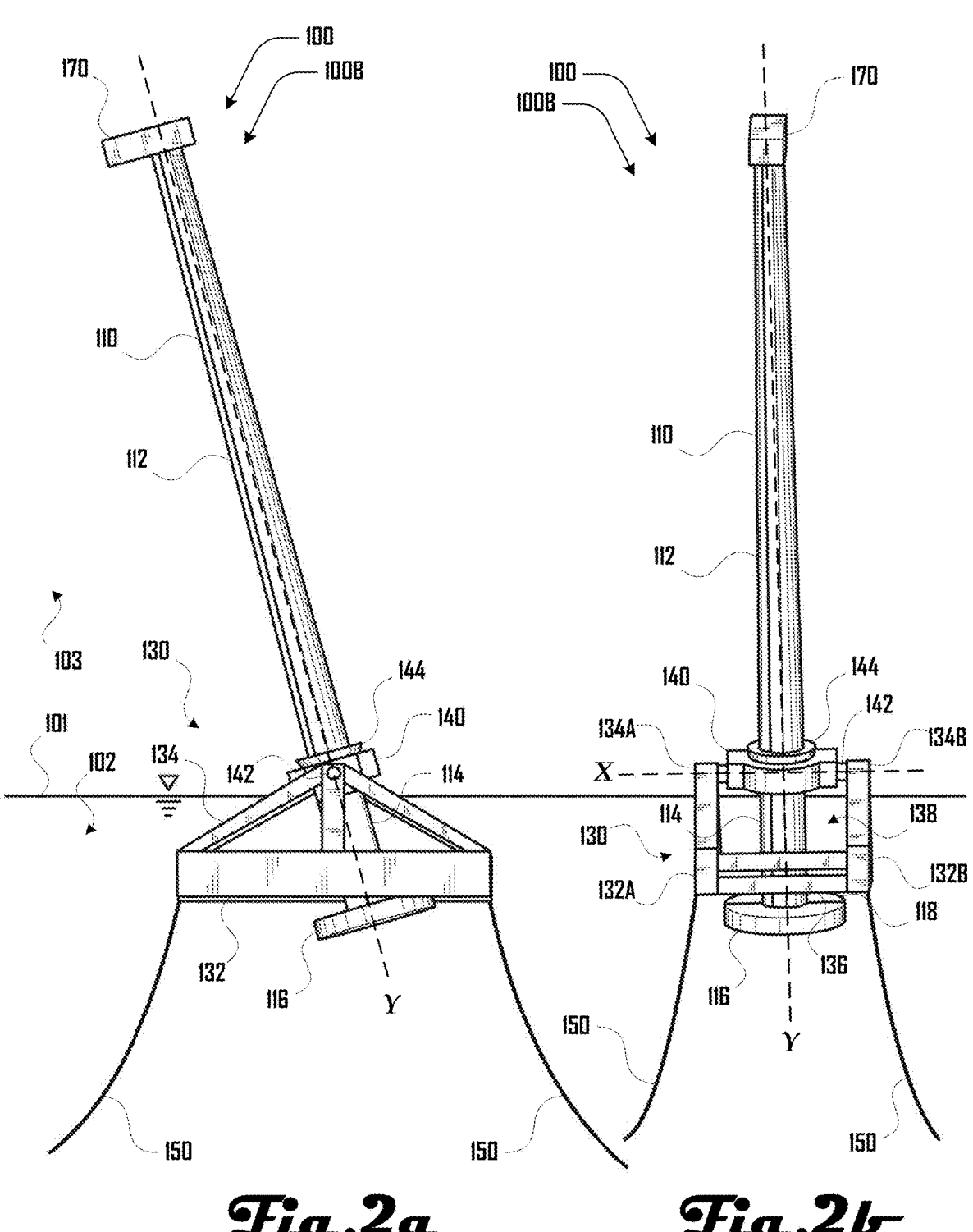

Turning to FIGS. 1a, 1b, 2a and 2b, two example embodiments 100A, 100B of a floating wind turbine 100 are illustrated in FIGS. 1a and 1b and in FIGS. 2a and 2b respectively. The floating wind turbine 100 is shown comprising a tower body 110 having a tower shaft 112 that extends along an axis Y. The tower body 110 further comprises a tower base 114 at a bottom end of the tower shaft 112, with a keel plate 116 disposed at a terminal bottom end of the tower body 110. One or more fins 118 can extend between the keel plate 116 and tower base 114 to reinforce a coupling between the keel plate 116 and tower base 114 and/or provide dampening for rotation, movement or pitch of the tower 110.

Figure 7:
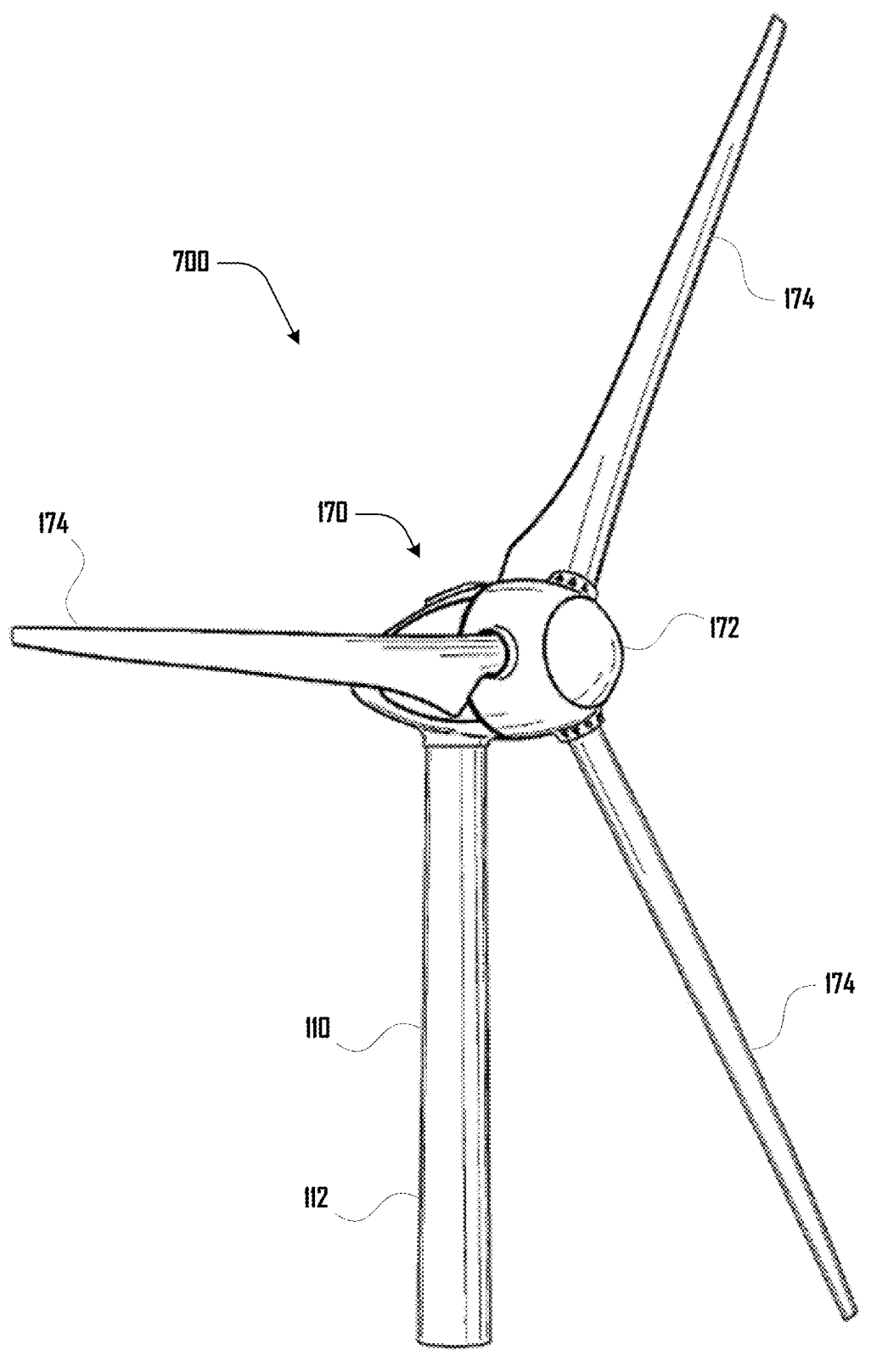
FIG. 7 is a perspective view of a nacelle that includes a wind turbine comprising three turbine blades.

A nacelle 170 can be disposed at a top end of the tower body 110. The nacelle 170 can be configured in various suitable ways and comprise various suitable elements, including a wind turbine 700 comprising a hub 172 with a plurality of blades 174 extending from the hub 172 as shown in the example of FIG. 7. Further embodiments can include any suitable plurality of blades 174, including 2, 3, 4, 5, 6, 7, 8, 9, 10, 11, 12, 16, 24, 36, 48, or the like. In some embodiments, a wind turbine 700 can operate in a horizontal-axis with and upwind or downwind rotor or can operate in a vertical-axis.

Various embodiments can include any suitable turbine elements, so the example of FIG. 7 should not be construed as being limiting. Additionally, while various example embodiments herein relate to wind turbines, it should be clear that further embodiments can be employed for various suitable purposes including a light house, bridge, communications array, weather station, observation station, weapon mount, or the like.

Returning to FIGS. 1a, 1b, 2a and 2b, the floating wind turbine 100 is further shown comprising a hull 130 that includes a pair of base elements 132 and a pair of support architectures 134, which are spaced apart and coupled together via one or more bars 136. As shown in the examples of FIGS. 1b and 2b, the pair of base elements 132A, 132B, the pair of support architectures 134A, 134B and the one or more bars can define a hull cavity 138.

A pitch plate 140 can extend between the support architectures 134A, 134B and be rotatably coupled to the hull 130 via pitch shaft 142, which allows the pitch plate 140 to rotate about an axis X. The tower shaft 112 and/or tower base 114 can extend through and be coupled to the pitch plate 140, which can allow the tower 110 to rotate about the axis X via the pitch plate 140. In various embodiments, axis Y of the tower 110 can be perpendicular to and/or coincident with the axis X. As shown in the examples of FIGS. 1a, 1b, 2a and 2b (and also FIG. 3 discussed in more detail herein), such rotation of the tower 110 via the pitch plate 140 can allow the tower base 114 and/or keel plate 116 to swing or pitch within the hull cavity 138 to various configurations as discussed herein.

Additionally, the tower 110 can be coupled to the pitch plate 140 via a yaw bearing 144, which can allow the tower shaft 112 and/or tower base 114 to rotate about axis Y of the tower 110. Providing for rotation of the tower 110 about the axis Y can be desirable in some embodiments to position the nacelle 170 in a desired or optimal direction, such as at an angle where a wind turbine 700 associated with the tower 110 produces a maximum amount of energy, produces a maximum amount of energy without compromising structural integrity of the blades 174, to protect the blades 174 from wind damage, and the like. Additionally, in some embodiments, the nacelle 170 can be rotatably coupled to the top of the tower 110 in addition to or as an alternative to a yaw bearing 144. In some embodiments (e.g., downwind turbine embodiments), there may be or may not be a yaw motor or actuator that actively drives yaw rotation of the tower 110 about central axis Y. In some examples, wind turbine weathervanes can be downwind and the yaw bearing 144 can allow passive rotation of the tower 110 relative to the hull 130. In another embodiment, a conical bearing can allow free yaw motion of the tower 110, while the hull 130 can be split (e.g., as shown in FIGS. 1a, 1b, 2a and 2b).

In an upwind turbine embodiment, the yaw bearing 144 can replace the need for a yaw controller in the nacelle 170. In one such embodiment, a motor can drive the yaw bearing 144 so that the nacelle 170 faces into the wind. In this configuration, in some examples, it can be desirable for the axis X of the pitch shaft 142 to be perpendicular to the incident wind direction to minimize off-axis loading on bearings or other elements of the floating wind turbine 100.

The floating wind turbine 100 can be configured to float and be disposed on the surface 101 of a body of water 102 with a portion of the floating wind turbine 100 being disposed within the body of water 102 and a portion of the floating wind turbine 100 being disposed above 103 the body of water 102. For example, in the embodiments 100A, 100B of FIGS. 1a, 1b, 2a and 2b, the nacelle 170, tower shaft 112, pitch plate 140, pitch shaft 142, yaw bearing 144, and axis X are shown being disposed above 103 the surface 101 of the body of water 102. A portion of the tower base 114 and support architectures 134 are shown as being partially above 103 and within the body of water 102. The base elements 132 of the hull 130 and keel plate 116 of the tower 110 are shown being below the surface 101 of the body of water 102. The floating wind turbine 100 can be disposed in any suitable body of water or fluid, including an ocean, lake, river, man-made body of water, or the like.

Further embodiments can be configured for various elements of the floating wind turbine 100 to be positioned in various suitable locations relative to the surface 101 of a body of water 102 that the floating wind turbine 100 is floating on, so the examples of FIGS. 1a, 1b, 2a and 2b should not be construed to be limiting. Additionally, as discussed herein, the buoyancy of the floating wind turbine 100 can be modified in various embodiments, which may change which elements are above 103 or within the body of water 102 at a given time. In some embodiments, it can be desirable to have elements such as at least a portion of the tower base 114 and the keel plate 116 disposed within the body of water 102 to provide resistance to or dampening of rotation of the tower 110.

For example, in some embodiments, one or more fins 118 can have a planar face that is parallel to the axis of rotation X, which can provide a surface area that provides resistance to or dampening of rotation of the tower 110 based on friction between such a surface area and water 102 in which the fins 118 of the tower rotate 110. Additionally, in some embodiments, it can be desirable to have elements such as the pitch plate 140, pitch shaft 142, and/or yaw bearing 144 disposed above the surface 101 of the water 102 to prevent or reduce water intrusion, corrosion, or the like, of such elements.

In various embodiments, it can be desirable to fix or substantially fix the floating wind turbine 100 in a location on the surface 101 of the water 102. For example, it can be desirable to prevent the floating wind turbine 100 from drifting away or preventing the floating wind turbine 100 from contacting undesirable objects such as another floating wind turbine 100 (e.g., in a wind farm), a reef, a beach, rocks, a cliff, or the like. In various embodiments, including the examples of FIGS. 1*a*, 1*b*, 2*a* and 2*b*, one or more mooring lines 150 can be coupled to the floating wind turbine 100 to fix or substantially fix the floating wind turbine 100 in place. For example, such one or more mooring lines 150 can coupled to various suitable locations on the hull 130 such as the support architecture 134 (see FIGS. 1*a* and 1*b*) base element(s) 132 (see FIGS. 2*a* and 2*b*), or the like. Mooring lines 150 in some examples can be coupled to weights or anchors at an ocean floor, lakebed, riverbed or the like.

Figure 6:
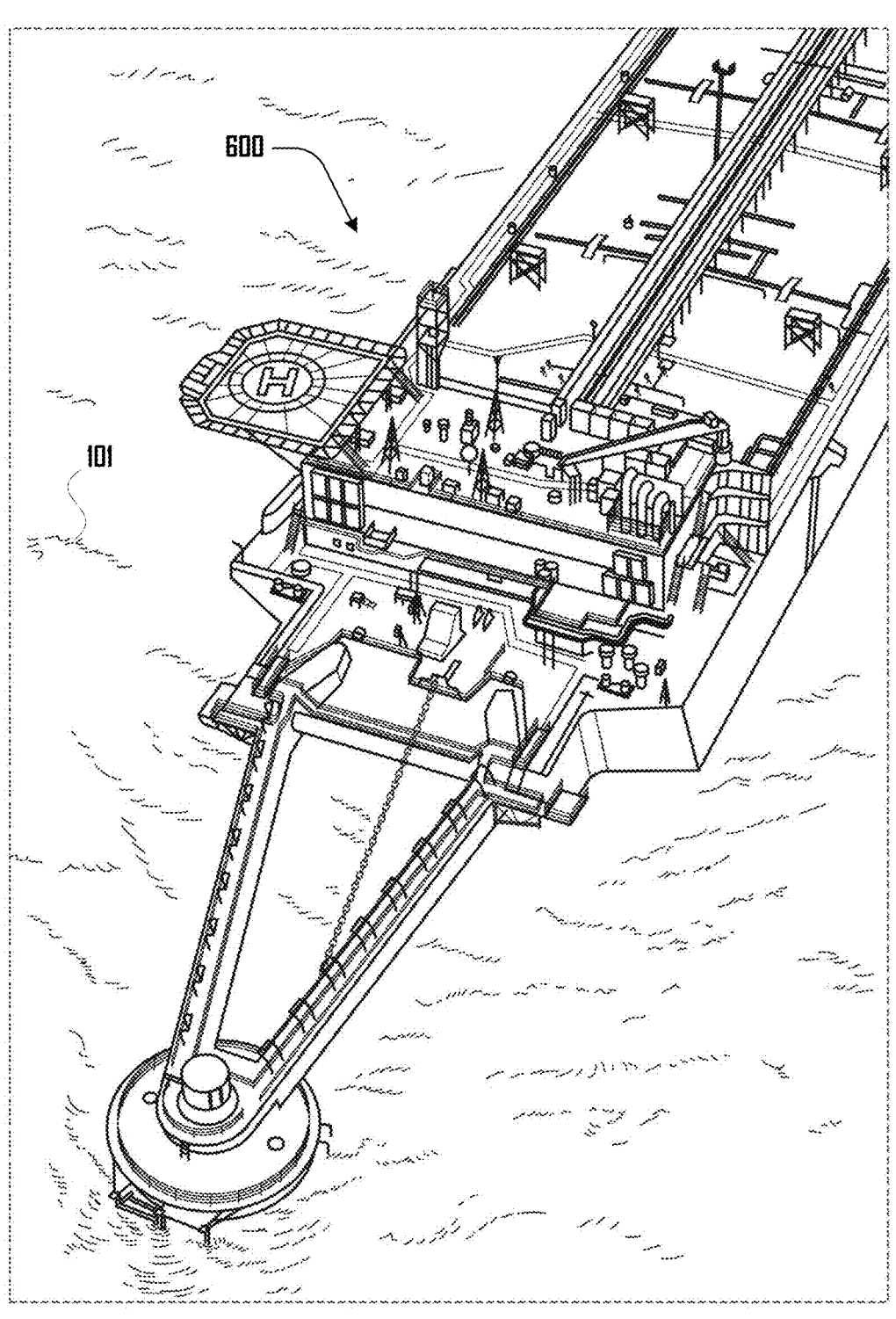
FIG. 6 is a top perspective view of a rigid arm single point mooring (SPM) buoy system in accordance with an embodiment.

In some embodiments, the floating wind turbine 100 can be connected to a turret system or a single point mooring buoy, such as those on Floating Production, Storage and Offloading units (FPSOs). An example of such a mooring buoy system 600 is shown in FIG. 6. In some embodiments, such a turret system can either be driven to rotate upwind or be passively allowed to weathervane downwind.

In various embodiments, the floating wind turbine 100 can generate electrical power (e.g., via wind turning a wind turbine 700 as illustrated in the example of FIG. 7) and generated electrical power can be transmitted to various locations via one or more electrical cables 155, which in various embodiments can extend from the bottom of the keel plate 116 as shown in FIGS. 1*a* and 1*b*. For example, in some embodiments, the electrical power generated by a floating wind turbine 100 can be transmitted to land, a battery station, another floating wind turbine 100, a water-based electrical power consumer (e.g., a floating home, ship, station, or the like). Additionally, in some embodiments, one or more electrical cables 155 can be configured to provide electrical power to a floating wind turbine 100, which can be received from land, a battery station, another floating wind turbine 100, or the like.

Figure 3:
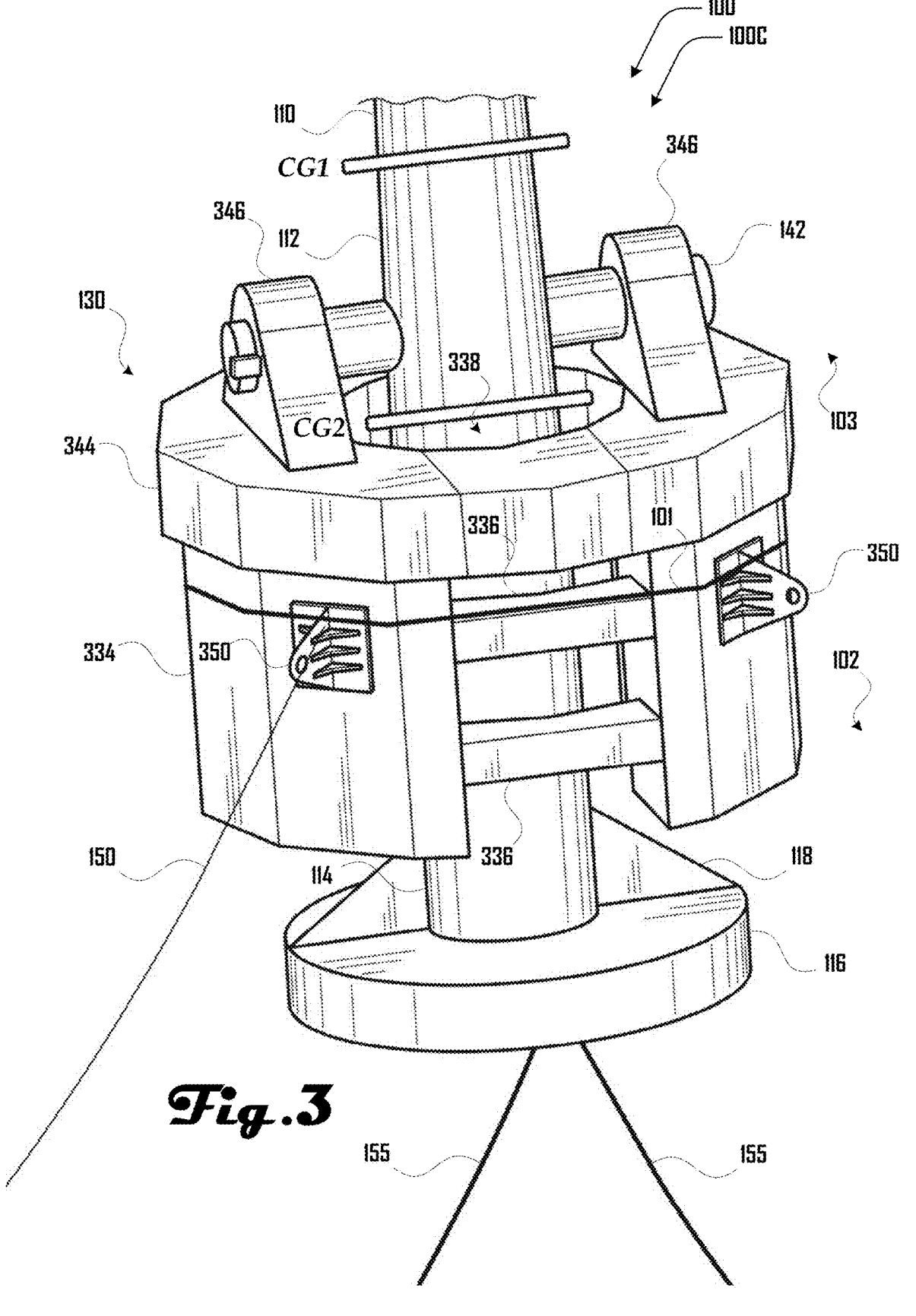
FIG. 3 is a perspective view of a further example embodiment of the hull and tower of a floating wind turbine.

Turning to FIG. 3, a portion of further embodiment 100C of a floating wind turbine 100 is illustrated, which includes a tower 110 that is rotatably coupled to a hull 130 via a pitch shaft 142. In this example embodiment 100C, the hull 130 can comprise one or more floater modules 334 that surround the tower 110 and one or more connectors 336 extending between floater modules 334. In some examples, the connectors 336 can comprised hinged connections that stiffen the hull 130, but allow for the tower 110 upending as discussed herein.

A yaw unit 344 can be disposed at a top end of the hull 130, with a pair of pitch units disposed on the yaw unit 344 that hold the pitch shaft 142 and can allow the tower 110 to rotate via the pitch shaft 142. The floater modules 334, connectors 336 and yaw unit 344 can define a hull cavity 338 through which the tower 110 can extend and pitch or rotate via the pitch shaft 142. The yaw unit 344 can be configured to rotate to allow the tower 110 to rotate about a central axis (e.g., axis Y as shown in FIGS. 1*a*, 1*b*, 2*a* and 2*b*). The hull 130 can further comprise one or more fairleads 350 that allow mooring lines 150 to couple with and secure the floating wind turbine 100 as discussed herein.

In various embodiments, the base of the yaw unit 344 can comprise a floating body that is designed in a "C" shape that can allow for 90 degrees of pitch rotation for the tower 110 of the floating wind turbine 100. In some embodiments, connectors 336 can be hinged and can allow for the tower 110 to articulate when the connectors 336 are opened, and when the connectors 336 are closed, can provide load transfer throughout the structure of the hull 130.

Figure 5:
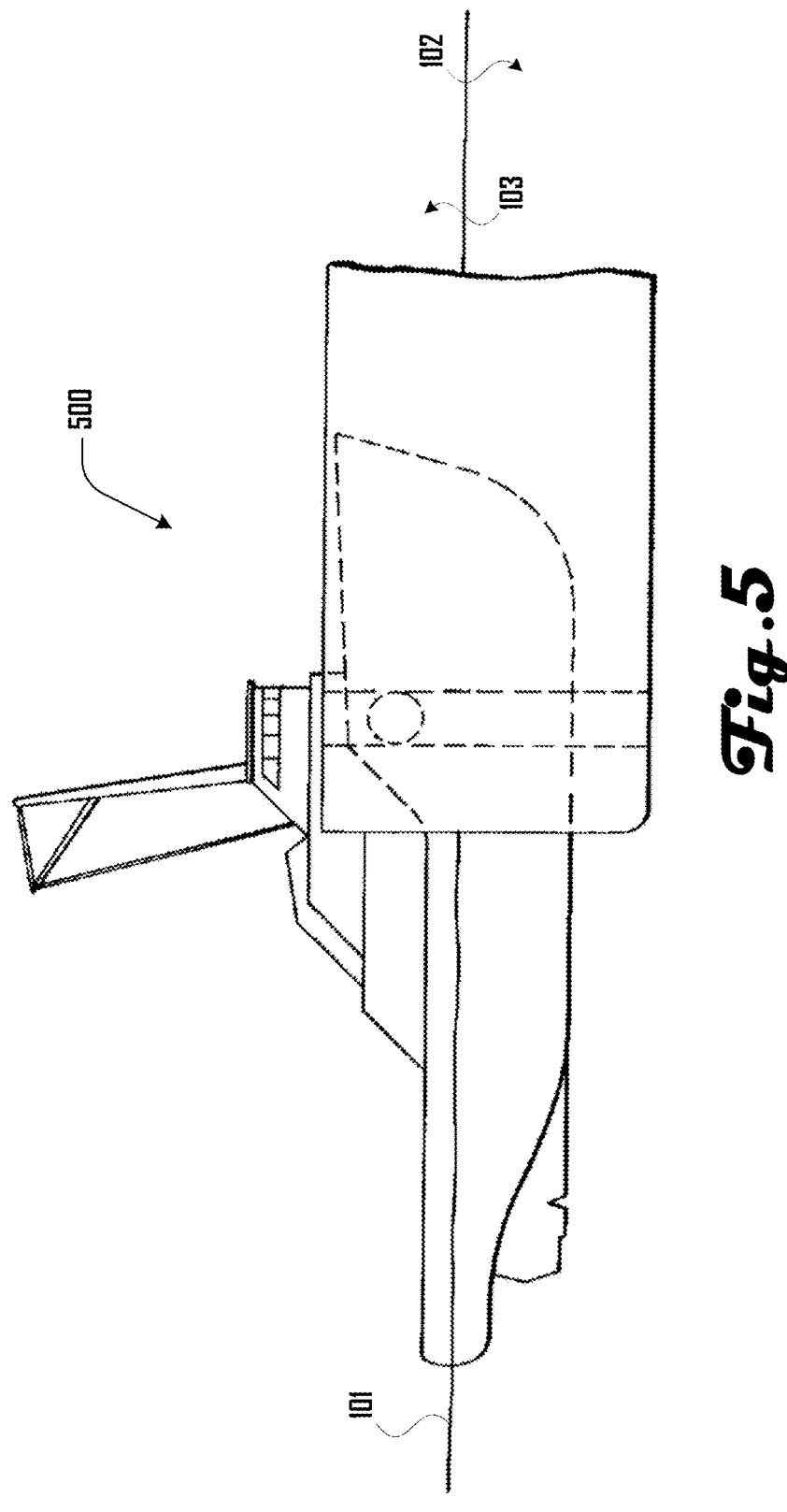
FIG. 5 is a side view of an articulating tug barge with retractable rams in accordance with an embodiment.

In some embodiments, pitch bearings can be disposed on the tower 110 and the pitch shaft 142 can comprise a retractable ram that allows the tower 110 to disconnect from the floating hull 130. In various examples, such an assembly can be used with an articulating tug barge 500, as shown in FIG. 5. In another embodiment, the tower 110 can be connected to the hull 130 via a hinged joint. In order to up-end the turbine in some examples, internal cables can be tensioned. In one such an embodiment, the floating hull 130 can be in a more structurally efficient toroidal shape.

Figure 4:
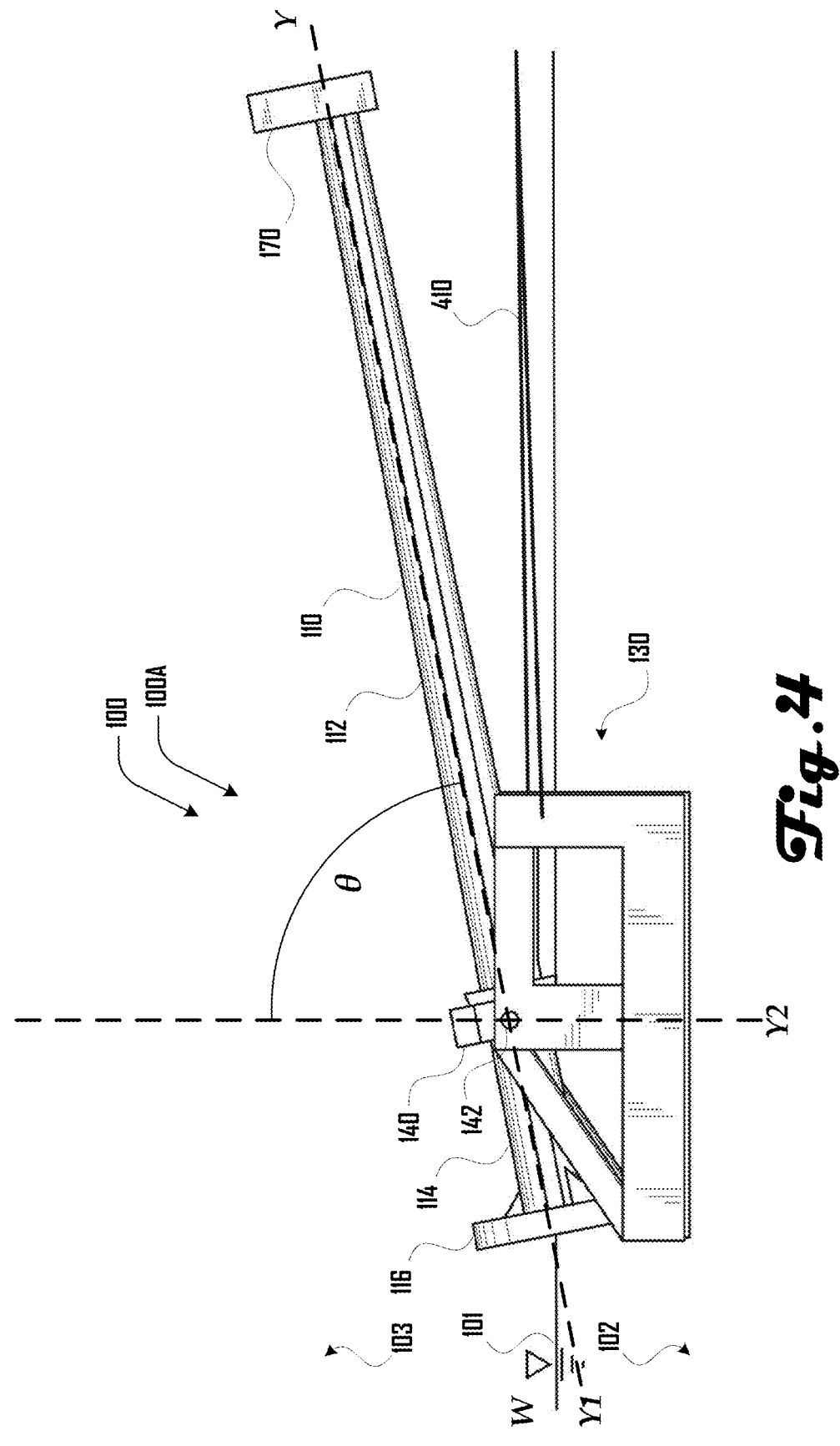
FIG. 4 is a side view of a floating wind turbine in a near horizontal or non-vertical configuration.

As discussed herein, in various embodiments a pitch shaft 142, or the like, can allow the tower 110 of the floating wind turbine 100 to assume a vertical or near-vertical configuration (e.g., for power-producing) as shown in the FIGS. 1*a*, 1*b*, 2*a* and 2*b* or horizontal or near-horizontal configuration (e.g., for installation, transit, load mitigation) as shown in FIG. 4. For example, FIG. 4 illustrates an embodiments 100A of a floating wind turbine 100 where the central axis Y of the tower 110 is in a near-horizontal configuration and disposed along axis Y1, with the tower 110 being configured to pitching about pitch shaft 142 an angle θ to assume a vertical or near-vertical configuration where the central axis Y of the tower 110 is disposed along axis Y2. In various embodiments, configuration or axis Y2 can be vertical or near-vertical relative to gravity, the plane W of the surface 101 of the body of water 102 that the floating wind turbine 100 is floating on, a main horizontal axis of the floating wind turbine 100, or the like.

In some embodiments, a floating wind turbine 100 can be configured to pitch or rotate any suitable angle θ from a vertical or near-vertical configuration (e.g., from axis Y2), including positive and/or negative 45°, 50°, 55° 60°, 65°, 70°, 75° 80°, 85°, 90°, 95° 100°, 105°, 110°, 115°, 120°, 125°, 130°, 135°, or the like. For example, some embodiments can be configured to rotate in only one direction from a vertical or near-vertical configuration or can be configured to rotate or pitch both directions from a vertical or near-vertical configuration. In some embodiments, a maximum rotation in both directions can be the same or can be different (e.g., any of the example values cited above). In some embodiments, the tower 110 can be configured to pitch or rotate and amount that prevents the tower 110, nacelle 170 or a wind turbine of the nacelle 170 from extending into the water 102 or engaging the surface 101 of the water 102; however, some embodiments can be configured for the tower 110, nacelle 170 and/or a wind turbine of the nacelle 170 to extend into the water 102 or engage the surface 101 of the water 102.

In various embodiments, rotation or pitch of the tower 110 can be configured based on the ability of the hull 130 to rotate, pitch or move on the surface 101 of the water 102 due to waves, wind, storms, or the like. In some examples, the orientation of the tower 110 can be actively controlled relative to the hull 130 such that the tower 110 can be maintained at a vertical or near-vertical configuration even if the hull 130 rotates, pitches or moves on the surface 101 of the water 102. For example, the orientation of the tower 110 and/or hull 130 can be monitored and determined relative to a desired vertical or near-vertical configuration and a motor, actuator, or the like can actively change to the orientation of the tower 110 toward the desired vertical or near-vertical configuration despite rotation, pitch or movement of the hull 130 on the surface 101 of the water 102.

One embodiment of a method of operating a floating wind turbine 100 can include determining an orientation of the tower 110 and/or hull 130; determining whether the tower 110 is in an orientation that is not a vertical or near-vertical configuration or within a margin of error of a vertical or near-vertical configuration based at least in part on the determined orientation of the tower 110 and/or hull 130; and actuating the tower 110 (e.g., about the pitch shaft 142) to move the tower 110 toward the desired vertical or near-vertical configuration or within a margin of error of the desired vertical or near-vertical configuration. In some embodiments, such a method can be performed in real time, near real-time, or every 0.25, 0.5, 0.75, 1.0, 1.5, 2.0, 3.0, 4.0, 5.0, 10.0 seconds, or the like.

A floating wind turbine 100 where the tower 110 is configured to assume a horizontal, near horizontal or non-vertical configuration can be desirable for operations such as installation of the floating wind turbine 100, assembly of the floating wind turbine 100, transit of the floating wind turbine 100, maintenance of the floating wind turbine 100, load mitigation of the floating wind turbine 100, or the like. For example, FIG. 4 illustrates an example embodiment, where tow lines 410 are coupled to the hull 130 of the floating wind turbine 100, which can be used to move the floating wind turbine 100.

Additionally, in some examples, where a determination is made that winds or other weather conditions could cause damage to elements the floating wind turbine 100 (e.g., blades 174, tower shaft 112, or the like), the tower 110 can be automatically or manually lowered to a horizontal, near horizontal or non-vertical configuration to protect the floating wind turbine 100 from damage. For example, a method of operation of a floating wind turbine 100 can include determining that wind or weather conditions are above or are predicted to be above a safety threshold, and if so, lowering the tower 110 to a horizontal, near horizontal or non-vertical configuration to protect the floating wind turbine 100. Such a determination can be made by one or more weather, wind or other sensors at the floating wind turbine 100, at another floating wind turbine 100, by a weather station, by an onshore device, or the like. In some embodiments, a computing device of the floating wind turbine 100 can make such a determination based on local and/or remote data and can automatically lower the tower 110 without user input, alert a user to the danger and receive instructions to lower the tower 110, or the like. In some examples, lowering of the tower 110 can be performed by a motor or other actuator and in some examples, the tower 110 changed from being in a locked configuration to an unlocked configuration, which can allow the tower 110 to fall or lower under its own weight.

In various embodiments, portions of the floating wind turbine 100 can be configured to have or contain a variable amount of mass or ballast. In some embodiments, a portion of the tower base 114 or portion of the tower 100 below the pitch shaft 142 can be configured for mass or ballast to be added or removed therefrom. For example, in various embodiments, the tower base 114 and/or keel plate 116 can comprise a cavity in which a ballast material (e.g., sand, weights, water or the like) can be introduced or removed from. In further embodiments, ballast or mass (e.g., weights, sandbags, water bladders, or the like) can be coupled to or removed from the tower base 114 and/or keel plate 116.

Such an addition of such ballast material can lower the center of gravity of the tower 110 in various examples such as from a first higher center of gravity CG1 to a lower center of gravity CG2 as shown in FIG. 3. In various embodiments, addition of such ballast material can lower the center of gravity of the tower 110 from being above the pitch shaft 142 to below the pitch shaft 142 (see e.g., FIG. 3), which can cause or make it easier for the tower 110 to rise from a horizontal, near horizontal, or non-vertical configuration (see e.g., FIG. 4) to a vertical or substantially vertical configuration (see e.g., FIGS. 1*a*, 1*b*, 2*a*, and 2*b*). In further embodiments, adding ballast can lower the center of gravity of the tower 110 from first position above the pitch shaft 142 to a second position above the pitch shaft 142 or can lower the center of gravity of the tower 110 from first position below the pitch shaft 142 to a second position below the pitch shaft 142.

A single floating wind turbine 100 or an array of a plurality of floating wind turbines 100 can be manufactured, erected or positioned in various suitable ways with various portions occurring on land and/or a body of water 102. For example, in some embodiments, during fabrication and/or assembly of the hull 130 and tower 110, the tower 110 can be either in a vertical position or in a horizontal position. In one embodiment, the nacelle 170, wind turbine 700 and/or blades 174 can be mated with the tower 110 in a horizontal position or substantially horizontal position. Such an embodiment in some examples can use smaller, more readily available cranes to lift the tower 110 or sections thereof, along with the nacelle 170 and/or blades 174 of the wind turbine 700. In some examples, before, during, or just after installation of the nacelle 170, wind turbine 700, blades 174, or the like, ballast (e.g., solid or liquid ballast) can be added to the tower base 114 to balance out the weight of such elements. In one embodiment, the solid ballast can take the form of batteries. In some embodiments, ballast can be added incrementally as additional elements are installed on the tower 110, nacelle 170 or the like.

In one embodiment, the amount of ballast added can be calculated so that the vertical center of gravity of the tower 110 (including a nacelle 170 wind turbine 700, and the like) is located at or substantially the pitch axis X (see e.g., FIGS. 1*b* and 2*b*). In such an embodiment (in the absence of friction), there may be no resultant overturning moment from the weight of the turbine 700, tower 110, or the like, on the hull 130. Such an embodiment may reduce the holding force required to keep the floating wind turbine 100 in a horizontal, near horizontal position or non-vertical position and may also reduce the force required to rotate the tower 110 relative to the hull 130 (e.g., to or from a vertical or near vertical position).

In some embodiments, once the tower 110 has been integrated onto the hull 130 on or near land (e.g., via the pitch shaft 142, in various examples the assembled floating wind turbine 100 can be towed from a port to a location on a body of water 102 where the floating wind turbine 100 will be installed. Many ports have draft or air draft restrictions as previously described, which can be the distance from the surface of the water 101 to a highest point on a vessel, cargo on a vessel or cargo being towed by a vessel. Draft restrictions can be less than or equal to 7 m, 8 m, 9 m, 10 m, 12 m or the like. Air draft restrictions can be less than or equal to 35 m, 40 m, 45 m, 50 m, 55 m, 60 m, 70 m, 75 m, 80 m, 85 m, 90 m, or the like. Once these obstructions or restrictions have been cleared, the platform can be reconfigured to have a larger draft, or a larger air draft or both a larger draft and a larger air draft.

In one embodiment, the tower base 114 and/or keel plate 116 can be filled with sand, gravel, dirt or the like, away from the port (e.g., once any port obstructions and/or restrictions have been cleared), since such a material may be a readily available, low-cost solid ballast option. Furthermore, on return to the port or land for a maintenance operation where lowering the tower 110 may be necessary or desirable, such a ballast material can simply be dropped to the seafloor, if necessary, without harming the environment, which can allow the tower 110 to be lowered or more easily lowered. After the maintenance operation and when the floating wind turbine 100 is being re-installed or installed in a new location on a body of water 102, new ballast can again be added to the tower 110 as discussed herein to raise the tower 110 or to make raising the tower 110 easier (e.g., tower pitch motors may be incapable of raising the tower without the addition of a sufficient amount of ballast.

In various embodiments, once the additional ballast has been added, the vertical center of gravity of the tower 110 can be dropped below the pitch axis X (see e.g., FIG. 3). This can result in the wind turbine tower 110 being up-ended and in a vertical or near-vertical position. The floating wind turbine 100 can then be towed (e.g., via tow lines 410) to an offshore wind farm site, so it can be installed (e.g., connected to a mooring and/or cabling system comprising mooring lines 150, electrical cables 155, or the like). In another embodiment, the floating wind turbine 100 can be towed with the tower 110 in a horizontal, near horizontal or non-vertical position (e.g., as shown in FIG. 4) so that the drag on the tower 110 and associated elements can be reduced. In such an embodiment, the turbine upending can occur at the wind farm site (e.g., via adding ballast, a pitch motor, crane, or the like).

In various examples, after the hull 130 is connected to the cable and/or mooring systems, the turbine 700 can be commissioned. In one embodiment with an upwind horizontal-axis wind turbine, the horizontal center of gravity of the tower 110 is located towards the hub 172 of the nacelle 170. A static overturning moment can result and the turbine 700 can be tilted into the wind. An optimal static tilt angle into the wind in some examples may be in the range of 5-15 degrees, 7-13 degrees, 9-11 degrees, 4-17 degrees, 3-19 degrees, 2-20 degrees, and the like. For certain low wind speeds, the tilt of the turbine 700 can result in increased power production since the tilt angle of the turbine 700 can offset the tilt angle of the nacelle 170 in various embodiments. In higher wind speeds, in some examples the turbine 700 can tilt out of the direction of the wind.

In some embodiments, fins 118 can added to the base 114 and or keel plate 116 of the tower 110 which can increase the viscous damping effects of the tilting tower 110. In the case of an emergency shutdown, or other event where there is a dramatic change in the thrust force, the floating wind turbine 100 may exhibit large dynamic tilting motion. The fins 118 can, in some examples, dissipate the energy from the dynamic tilt motion into the surrounding fluid 102 thereby reducing the loads transferred to the hull 130.

As previously described, if the floating wind turbine 100 is to return to port for maintenance, decommissioning, or the like, ballast in and/or on the keel plate 116 and/or tower base 114 can be removed. This can decrease the draft of the floating wind turbine 100, allowing it to enter a port with draft restrictions. Furthermore, the tower 110 can be moved into a horizontal position in various examples without the need for large tugboats when the vertical center of gravity aligns with or is close to the pitch axis X (e.g., based on addition or removal of ballast).

Accordingly, a method of installing at least one floating wind turbine 100 can include one or more of the follow steps, which can start with assembling at least a portion of a tower 110 and hull 130 floating wind turbine 100 and then coupling the tower 110 to the hull 130 (e.g., via a pitch shaft 142). Some or all of such assembly can occur on land including at a port or shoreline, or away from a port or shoreline. For example, the tower 110 and hull 130 (or portions thereof) can be transported to a port or shoreline as separate pieces, with the tower 110 and hull 130 (or portions thereof) being assembled to form a full or substantially complete floating wind turbine 100.

Such a full or substantially complete floating wind turbine 100 can have the tower 110 in a horizontal or near horizontal configuration while being assembled and/or during a portion of a journey from a port or shoreline to a desired location where the floating wind turbine 100 is to be installed. When possible or desirable, the floating wind turbine 100 can be converted from the tower 110 being in the horizontal or near horizontal configuration to an erected configuration where the tower 110 is in a vertical or near vertical configuration.

For example, as discussed herein, in some embodiments erecting the tower 110 can include adding ballast into and/or on a portion of the tower 110 to change the center of gravity of the tower 110, which can cause the tower 110 to self-erect or may make it possible for a pitch actuator, crane, or the like to erect the tower 110. In various embodiments, such a method or portions thereof can be performed in reverse when the floating wind turbine 100 needs to be decommissioned, repaired, lowered or moved to prevent damage that may be caused by wind or weather, or the like.

Turning to FIGS. 8-11 another embodiment 100D of a floating wind turbine 100 is illustrated that comprises a tower 110 coupled to a hull assembly 830 that includes with a central column 840 and a plurality of outer columns 850 that are coupled to the central column 840 via one or more respective upper truss members 860, one or more respective lower truss members 870 and one or more respective cross-beams 880. Note that elements such as a nacelle, rotor and turbine are not illustrated in these figures for purposes of simplicity.

Figure 9:
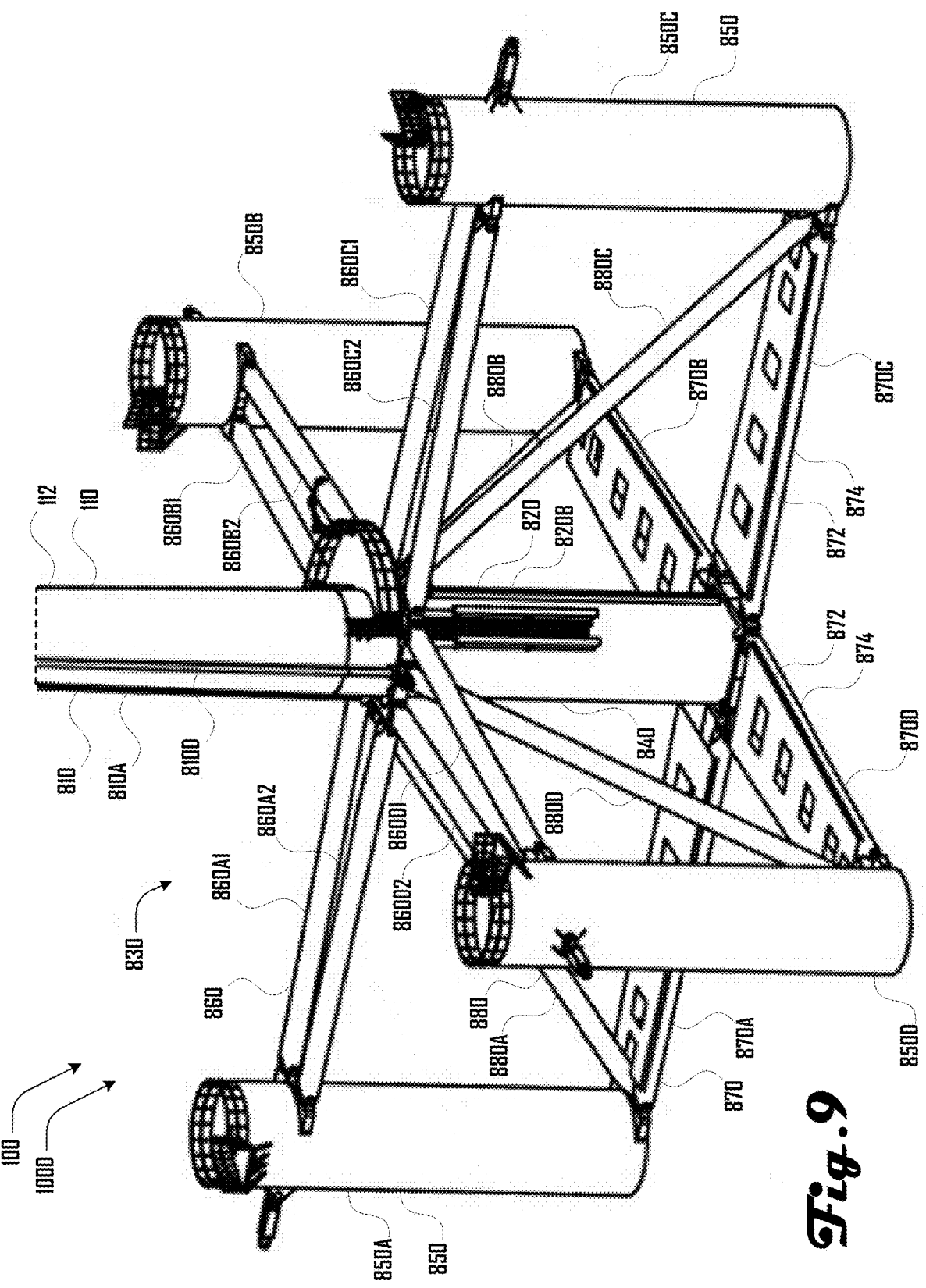
FIG. 9 is a close-up view of a lower portion of the floating wind turbine of FIG. 8.

The tower 110 can comprise a tower shaft 112 having a central axis Y with the central column 840 being disposed at a bottom end of the tower shaft 112 with the central column 840 sharing the central axis Y. As shown in the examples of FIGS. 8 and 9, the floating wind turbine 100 can comprise four outer columns 850A, 850B, 850C, 850D that are spaced apart from the central column 840 at an equal distance via the upper and lower truss members 860, 870 and cross-beams 880. In various embodiments, the outer columns 850 can have separate respective central axes that are parallel to the central axis Y of the tower 110 and central column 840. In various embodiments, the outer columns 850 and/or central column 840 can comprise ballast tanks configured to hold fluid such as air and/or water as discussed herein.

Additionally, the four outer columns 850A, 850B, 850C, 850D can be equally spaced about the central column 840 with respective adjacent outer columns 850 being 900 from each other about the central axis Y. For example, the first and third outer columns 850A, 850C can be disposed in a first common plane that is coincident with the central axis Y. The second and fourth outer columns 850B, 850D can be disposed in a second common plane that is coincident with the central axis Y and perpendicular to the first common plane of the first and third outer columns 850A, 850C.

Also, in various embodiments, the four outer columns 850A, 850B, 850C, 850D can be of equal length such that bottoms of four outer columns 850A, 850B, 850C, 850D are disposed within a third common plane and tops of the four outer columns 850A, 850B, 850C, 850D are disposed within a fourth common plane that is parallel to the third common plane and that is perpendicular to the central axis Y. In some embodiments, (e.g., a 10-15 MW turbine 700) the floating wind turbine can have a rotor diameter of 180-230 m. In various examples, the tower 110 can have a height of 100-150 m. In various embodiments, the columns 840, 850 can have a diameter of 8-12 m. In some examples, the outer columns 850 can be 40-50 m from the central column 840 (e.g., the upper and/or lower truss members 860, 870 can be 40-50 m long). In some examples the columns can have a height of 30-40 m. In various embodiments the columns 840, 850 can have an operating draft of 15-25 m.

As shown in the example embodiment 100D of the floating wind turbine 100 of FIGS. 8-11, each outer column 850 can be coupled to the central column 840 via a pair of upper truss members 860. For example, as shown in FIG. 9, the first outer column 850A can be coupled to the central column 840 via first and second upper truss members 860A1, 860A2. In various embodiments, the pairs of upper truss members 860 can extend from a top end of respective outer columns 850 at an angle with the distance between the pair of upper truss members 860 increasing toward the central column 840. For example, such an angle can be 2°, 4°, 6°, 8°, 10°, 12°, 14°, 16°, 18°, 20°, 22°, 24°, 26°, or the like, including a range between such values. In various embodiments the upper truss members 860 can be configured to extend toward the central column 840 in a common plane that is perpendicular to the central axis Y.

In various embodiments, the upper truss members 860 can be cylindrical bars as shown in the example embodiment 100D of the floating wind turbine 100 of FIGS. 8-11, but in further embodiments, the upper truss members 860 can be any suitable form such as an I-beam, box truss, or the like. Additionally, in various embodiments, there can be any suitable number of upper truss members 860 associated with each outer column 850 such as 1, 2, 3, 4, 5, 10, 25, 100 and the like. Also, various structures can be associated with the upper truss members 860 such as plates, walkways, and the like.

As shown in the example embodiment 100D of the floating wind turbine 100 of FIGS. 8-11, each outer column 850 can be coupled to the central column 840 via a lower truss member 870. For example, as shown in FIG. 9, the first outer column 850A can be coupled to the central column 840 via a first lower truss member 870A, the second outer column 850B can be coupled to the central column 840 via a second lower truss member 870B, the third outer column 850C can be coupled to the central column 840 via a third lower truss member 870C and the fourth outer column 850D can be coupled to the central column 840 via a fourth lower truss member 870D.

Figure 10:
FIG. 10 illustrates an example embodiment of a self-upending floating wind turbine in a folded (e.g., transport) configuration.

In various embodiments, the lower truss members 870 can comprise various suitable structures such as a plate and/or one or more bars (see e.g., FIGS. 9 and 10 showing a lower truss plate 872 covering a pair of lower truss bars 874). In some embodiments, where a pair of lower truss bars 874 extend from a bottom end of respective outer columns 850, such lower truss bars can extend at an angle with the distance between the pair of upper truss members 860 increasing toward the central column 840. For example, such an angle can be 2°, 4°, 6°, 8°, 10°, 12°, 14°, 16°, 18°, 20°, 22°, 24°, 26°, or the like, including a range between such values. In some examples, such an angle can be the same as upper truss members 860. In various embodiments, the lower truss members 870 can be configured to extend toward the central column 840 in a common plane that is perpendicular to the central axis Y, and in some examples such a common plane can be parallel to a common plane of upper truss members 860.

In various embodiments, the lower truss bars 874 can be cylindrical bars, but in further embodiments, such lower truss bars 874 or the lower truss members 870 can be any suitable form such as an I-beam, box truss, or the like. Additionally, in various embodiments, there can be any suitable number of lower truss bars 874 or the lower truss members 870 associated with each outer column 850 such as 1, 2, 3, 4, 5, 10, 25, 100 and the like.

As shown in the example embodiment 100D of the floating wind turbine 100 of FIGS. 8-11, cross-beams 880 can extend between respective outer columns 850 and the central column 840 from a bottom end of the respective outer columns 850 to respective locations at a top end of the central column 840. However, in further embodiments, cross-beams 880 can extend between respective outer columns 850 and the central column 840 from a top end of the respective outer columns 850 to respective locations at a bottom end of the central column 840.

For example, as shown in FIG. 9, the first outer column 850A can be coupled to the central column 840 via a first cross-beam 880A, the second outer column 850B can be coupled to the central column 840 via a second cross-beam 880B, the third outer column 850C can be coupled to the central column 840 via a third cross-beam 880C and the fourth outer column 850D can be coupled to the central column 840 via a fourth cross-beam 880D.

Additionally, the four cross-beams 880A, 880B, 880C, 880D can be equally spaced about the central column 840 with respective adjacent cross-beams 880 being 900 from each other about the central axis Y. For example, the first and third cross-beams 880A, 880C can be disposed in a first common plane that is coincident with the central axis Y. The second and fourth cross-beams 880B, 880D can be disposed in a second common plane that is coincident with the central axis Y and perpendicular to the first common plane of the first and third cross-beams 880A, 880C.

In various embodiments, the cross-beams 880 can be cylindrical bars, but in further embodiments, such cross-beams 880 can be any suitable form such as an I-beam, box truss, or the like. Additionally, in various embodiments, there can be any suitable number of cross-beams 880 associated with each outer column 850 such as 1, 2, 3, 4, 5, 10, 25, 100 and the like.

In various embodiments, the floating wind turbine 100 can be operable to change configurations between an erected configuration as shown in FIGS. 8 and 9 and a collapsed configuration as shown in FIG. 10. For example, the outer columns 850 can be individually movably coupled to the central column 840 such that the outer columns 850 can be folded upward and/or downward relative to the tower body 110 so that the outer columns 850 are retracted closer to the central axis Y to reduce the maximum dimensions of the hull assembly 830, which can be desirable for transportation of the floating wind turbine 100 in some examples as discussed herein.

For example, as shown in FIG. 10, a first pair of adjacent outer columns 850B, 850C can be configured to fold downward relative to tower body 110 so that the outer columns 850 are retracted closer to the central axis Y such that this pair of outer columns 850B, 850C is disposed fully or at least partially below the bottom of the central column 840. A second pair of adjacent outer columns 850A, 850D can be configured to fold upward relative to tower body 110 so that the outer columns 850 are retracted closer to the central axis Y such that this pair of outer columns 850A, 850D is disposed fully or at least partially above the top of the central column 840 about the tower shaft 112 of the tower body 110.

In various embodiments, such as shown in the example of FIG. 10, a respective main axis of the outer columns 850 can remain parallel to the central axis Y in the collapsed configuration of FIG. 10 and/or during the process of the outer columns 850 folding upward or downward from the erected configuration to the collapsed configuration. Such a folding in some embodiments can be based on one or more rotatable couplings between the outer columns 850 and the central column 840 and/or one or more translational rotational couplings between the outer columns 850 and the central column 840.

For example, respective ends of the upper and lower truss members 860, 870 can be rotatably coupled to the respective outer columns 850 and to the central column 840, which can allow the outer columns 850 to rotatably fold up and/or down. Additionally, ends of the cross-beams 880 that are rotatably coupled to the central column 840 can be configured to translate up and/or down the length of the central column 840 and/or tower shaft 112 of the tower body 110 and opposing ends of the cross-beams 880 that are coupled to the respective outer columns 850 can be rotatably coupled to the respective outer columns 850 such that the cross-beams 880 can fold toward the central column 840 and/or tower shaft 112 when the outer columns 850 rotatably fold up and/or down.

For example, referring to FIGS. 9 and 10, the first pair of adjacent outer columns 850B, 850C can be configured to rotatably fold downward relative to tower body 110 with opposing ends of the cross-beams 880B, 880C coupled to the central column 840 translating downward along the face of the central column 840 via respective cross-beam lower tracks 820 to allow the cross-beams 880B, 880C to fold toward the central column 840, to the collapsed configuration of FIG. 10, based on rotatable couplings at the ends of the second and third cross-beams 880B, 880C. (The lower track 820B of the second cross-beam 880B is shown in FIG. 9). Accordingly, the first pair of adjacent outer columns 850B, 850C are folded closer to the central axis Y such that this pair of outer columns 850B, 850C is disposed fully or at least partially below the bottom of the central column 840.

The second pair of adjacent outer columns 850A, 850D can be configured to rotatably fold upward relative to tower body 110 with the opposing ends of the cross-beams 880A, 880D coupled to the central column 840 translating upward along the face of the tower shaft 112 of the tower body 110 via respective cross-beam upper tracks 810A, 810B to allow the cross-beams 880A, 880D to fold toward the tower body 110, to the collapsed configuration of FIG. 10, based on rotatable couplings at the ends of the first and fourth cross-beams 880A, 880D. Accordingly, the second pair of adjacent outer columns 850A, 850D are folded upward closer to the central axis Y such that this second pair of outer columns 850A, 850D is disposed fully or at least partially above the top of the central column 840 proximate to and about the tower shaft 112 of the tower body 110.

Folding of the outer columns 850 from the erected configuration to the collapsed configuration (and vice versa) can be performed in various suitable ways. For example, in some embodiments, the translational couplings of the cross-beams 880 in the cross-beam upper and lower tracks 810, 820 can be based on buoyancy of the central column 840 and/or outer columns 850 as discussed herein and/or can be motorized (e.g., fluidic, electric, or fuel-powered), which can allow the up and down movement in the cross-beam upper and lower tracks 810, 820 that causes motorized actuation of the outer columns 850 up and/or down. Accordingly, in various embodiments, configuring the floating wind turbine 100 between the erected/extended and collapsed configurations can be motorized based on passive and/or powered translation of the cross-beams 880 in the cross-beam upper and lower tracks 810, 820.

In further embodiments, translation of the cross-beams 880 can be mechanical such as by a user rotating a crank or otherwise applying external mechanical force. In further embodiments, other portions of the floating wind turbine 100 can be configured to cause actuation of the outer columns 850, such as cables, winches, motors on a rotatable coupling, or the like. In some embodiments, actuation of the outer columns 850 can be performed by an external apparatus such as a crane, or the like. In some embodiments, actuation of the outer columns 850 can be performed based on forces of gravity or buoyancy such as based on ballast and/or air being introduced into or removed from the central column 840 and/or one or more outer columns 850.

In some embodiments, such as shown in FIGS. 8-11, the outer columns 850 are only configured to fold up or down from the erected configuration to the collapsed configuration. For example, a given outer column 850 may only be associated with a cross-beam upper track 810 or a cross-beam lower track 820, which can make the given outer column 850 only operable to fold up or down from the erected configuration to the collapsed configuration. In the example of FIGS. 8-11, the floating wind turbine 100 only has two cross-beam upper tracks 810 and two cross-beam lower tracks 820, which makes it such that the first pair of outer columns 850B, 850C are only configured to fold downward and the second pair of outer columns 850A, 850D are only configured to fold upward.

However, in some embodiments one or more of the outer columns 850 can be configured for bi-directional folding and can, for example, have both upper and lower cross-beam tracks 810, 820. Also, in some embodiments, each of the outer columns 850 can be separately actuated or can be configured to always be actuated as a group. For example, the first pair of outer columns 850B, 850C can be configured to be actuated together as a group; the second pair of outer columns 850A, 850D can be configured to be actuated together as a group; all four outer columns 850A, 850B, 850C, 850D can be configured to be actuated together as a group, or the like.

In various embodiments, a floating wind turbine 100 can be configured in pieces for assembly and/or disassembly, which can be desirable for transportation as discussed herein. For example, the upper truss members 860, lower truss members 870, and/or cross-beams 880 can have couplings (e.g., via pins, bolts, or the like) that allows such elements to be easily coupled and de-coupled with the central column 840 and/or outer columns 850 such that the upper truss members 860, lower truss members 870, and/or cross-beams 880 can be separable from the central column 840 and/or outer columns 850, which can allow the outer columns 850 and such elements to be separated from each other and the central column 840. In some embodiments, the central column 840 can be separated from the tower 110.

Additionally, in various embodiments, elements such as the nacelle 170, blades 174, rotor and the like can be configured to be disassembled from each other and/or the tower 100. For example, in various embodiments, one or more of such couplings can be non-permanent couplings instead of a weld or other integral coupling.

A single floating wind turbine 100 or an array of a plurality of floating wind turbines 100 can be manufactured, erected or positioned in various suitable ways with various portions occurring on land and/or a body of water 102. For example, in some embodiments, elements such as a tower 110, nacelle 170, blades 174, central column 840, outer columns 850, upper truss members 860, lower truss members 870, and/or cross-beams 880 can be manufactured separately and transported in a disassembled, partially assembled, or fully assembled form from a manufacturing location to a port, dock, or other location at a body of water 102.

For example, using FIGS. 8-11 as an illustration, in some embodiments the hull assembly 830 can be fully assembled (and may or may not be coupled with a tower 110) and transported to a body of water 102 in a collapsed configuration (see e.g., FIG. 10). In some examples, the central column 840, outer columns 850, upper truss members 860, lower truss members 870, and/or cross-beams 880 can be manufactured separately and transported to a body of water in a disassembled set and assembled at the body of water 102. In various embodiments, it can be necessary for the tower 110 to be present in a collapsed configuration so that outer columns 850 folding up can engage the tower 110 instead of over-folding or undesirably moving in the collapsed configuration.

In some embodiments, with the tower 110 integrated onto the hull assembly 830 on or near land, in various examples the assembled floating wind turbine 100 can be towed from a port to a location on a body of water 102 where the floating wind turbine 100 will be installed. Many ports have draft or air draft restrictions as previously described, which can be the distance from the surface of the water 101 to a highest point on a vessel, cargo on a vessel or cargo being towed by a vessel. Draft restrictions can be less than or equal to 7 m, 8 m, 9 m, 10 m, 12 m or the like. Air draft restrictions can be less than or equal to 35 m, 40 m, 45 m, 50 m, 55 m, 60 m, 70 m, 75 m, 80 m, 85 m, 90 m, or the like. Once these obstructions or restrictions have been cleared, the floating wind turbine 100 can be reconfigured to have a larger draft, or a larger air draft or both a larger draft and a larger air draft. For example, the floating wind turbine 100 can be configured from a collapsed configuration to an erected configuration, where the collapsed configuration is compliant or compatible with obstructions or restrictions (e.g., draft restrictions), but where the erected configuration would not be compliant or compatible with one or both of obstructions and restrictions.

Figure 11:
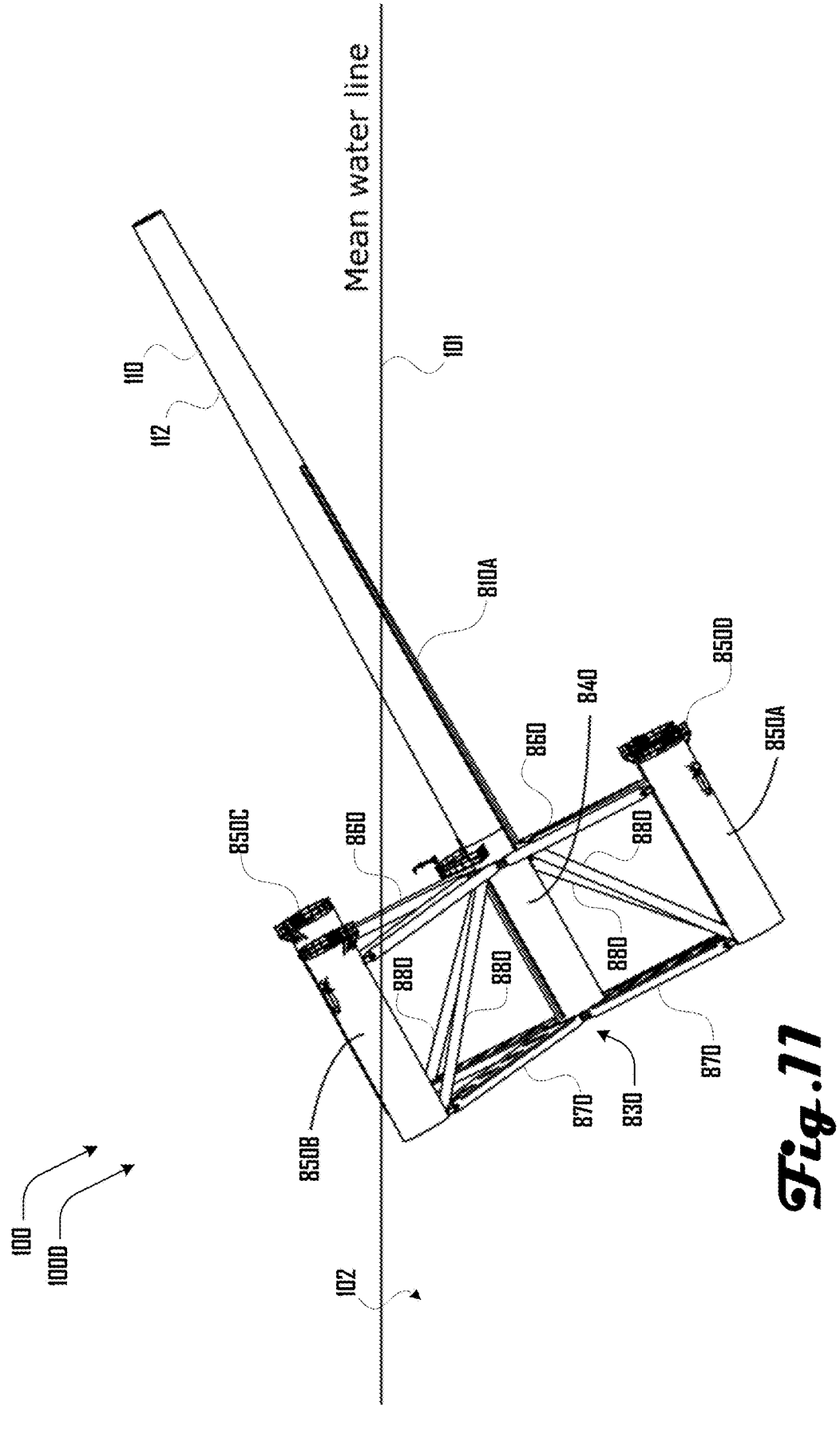
FIG. 11 illustrates an example embodiment of a self-upending floating wind platform during an upending operation.

Using FIGS. 8-11 as an example, in various embodiments, the process to upend a floating wind turbine 100 can include one or more fore floats (e.g., first and fourth outer columns 850A, 850D) and/or the central column 840 being filled with ballast (e.g., water from a body of water 102 that the floating wind turbine 100 is disposed in) so that the one or more fore floats (e.g., first and fourth outer columns 850A, 850D) are sunk within the body of water 102 and reach an extended configuration (e.g., as shown in FIG. 11). In doing so, the cross-beams 880 can have transited along their respective upper tracks 810 and can be (e.g., temporarily) locked into place.

In various embodiments, sinking of the floating wind turbine 100 into the body of water 102 below the water line (e.g., based on filling one or more columns 840, 850 with ballast) can cause one or more aft floats (e.g., second and third columns 850B, 850C) to move from a collapsed configuration (e.g., as shown in FIG. 10) to an extended configuration (e.g., as shown in FIG. 11). For example, where the floating wind turbine 100 has been sunk to a sufficient level within the body of water 102, the buoyancy of the one or more aft tanks (e.g., second and third columns 850B, 850C) can cause cross-beams 880 of such aft tanks to transit across the lower tracks 820 and reach an extend position, as depicted in FIG. 11.

The cross-beams 880 can be (e.g., temporarily) locked into place, and the floating wind turbine 100 can be upended in various embodiments to an erected configuration by (e.g., partially) evacuating the fore float(s) (e.g., first and fourth columns 850A, 850D) and/or central column 840 while partially filling the aft float(s) (e.g., second and third columns 850B, 850C). The change in ballast can produce a large uprighting moment, which can cause the floating wind turbine 100 and turbine 700 to upright from a configuration as shown in FIG. 11 and reach an operational erected configuration such as shown in FIG. 8. In some embodiments, a cross-beam 880 can be locked into place by inserting a pin into the cross-beam 880 which prevents the cross-beam from translating. Such a pin insertion in some examples can be triggered remotely such as by an operator on a support vessel, or the like.

In some embodiments, outer columns 850 can be extended one-by-one. Additionally, in some embodiments, the floating wind turbine 100 can rotate (e.g., about the main axis Y) based on ballast being introduced and/or removed from columns 850, which may be desirable for making it easier for the outer columns 850 can be extended one-by-one sequentially. For example, a first collapsed downward-facing outer column 850 can be extended based on ballast being added to this first collapsed outer column 850 to cause it to sink and become extended. Changing the buoyancy of one or more of the outer columns 850 can cause the floating wind turbine 100 to rotate and cause a second collapsed outer column 850 to be oriented downward such that the second collapsed outer column 850 can sink downward and extend. Further collapsed columns 850 can be extended sequentially in a similar manner.

In some embodiments, in such an operational erected configuration, the lower truss members 870 can be fully submerged within a body of water 102 below the surface 101 of the water 102; the central and outer columns 840, 850 can be partially submerged in the water 102, with a bottom portion submerged within the body of water 102 below the surface 101 and a top portion out of the water 102 above the surface 101; the upper truss member 860 can be above the surface 101 of the water 102; and the tower 110 can be above the surface 101 of the water 102. In various embodiments, the level of the central and outer columns 840, 850 above/below the surface 101 of the water 102 can be changed based on an amount of ballast and/or air in ballast tanks of the central and outer columns 840, 850.

In some embodiments, movement of some or all of the outer columns 850 from a collapsed configuration (e.g., FIG. 10) to an extended configuration (e.g., FIG. 11) can be completely based on buoyancy and/or gravity. For example, motorized or other active powered actuation of the upper truss members 860, lower truss members 870, and/or cross-beams 880 can be absent. In other words, in some embodiments, changing the configuration of the floating wind turbine 100 between a collapsed configuration and an extended configuration can be substantially or completely based on ballast or air being introduced or removed from the central column 840 and/or outer columns 850.

In one embodiment, ballast pumps are located on the floating wind turbine 100 and can be remotely operated to enact the filling of the ballast tanks (e.g., of the central column 840 and/or outer columns 850). In another embodiment, the ballast tanks (e.g., of the central column 840 and/or outer columns 850) are filled by opening a valve on the column via a remotely operated vehicle (ROV) or diver. In another embodiment, the ballast tanks are connected via a hose to ballast pumps onboard a support vessel such as a boat, ship or the like. In such an embodiment such ballast tanks can be filled and evacuated using the same pump run in reverse.

In various examples, after the floating wind turbine 100 is erected and connected to electrical cable systems 155 and/or mooring systems 150, the turbine 700 can be commissioned for attachment to the floating wind turbine 100; however, in some embodiments the turbine 700 can be installed onshore or in transit on water to an installation location and can be present when the floating wind turbine 100 is erected. For example, in some embodiments an upending maneuver can be performed with the nacelle 170 and blades 174 pre-installed or an upending maneuver can be performed without the nacelle 170 and blades 174 being pre-installed with such elements being added on after the upending maneuver. Some embodiments can include a nacelle 170 and blades 174 that can be pre-assembled horizontally.

As previously described, if the floating wind turbine 100 is to return to port for maintenance, decommissioning, or the like, such an installation or erection method can be reversed in part or in whole. This can decrease the draft of the floating wind turbine 100, allowing it to enter a port with draft restrictions or to access shallow water. Furthermore, the tower 110 can be moved into a horizontal position in various examples without the need for large tugboats when the vertical center of gravity aligns with or is close to the tower axis X. In some embodiments, the floating wind turbine 100 can be loaded on to a barge (e.g., submersible barge), for transport to or from shore.

Accordingly, a method of installing at least one floating wind turbine 100 can include one or more of the follow steps, which can start with assembling portions of the tower 110 and hull assembly 830 and then coupling the tower 110 to the hull assembly 830. Some or all of such assembly can occur on land including at a port or shoreline, or away from a port or shoreline. For example, the tower 110 and hull assembly 830 (or portions thereof) can be transported to a port or shoreline as separate pieces, with the tower 110 and hull assembly 830 (or portions thereof) being assembled to form a full or substantially complete floating wind turbine 100. In one example embodiment, each of the tower 110 and hull assembly 830 can be assembled in parallel. For example, an outer column 850 can be attached to a lower and upper truss member 860, 870, as well as a cross-beam 880 during assembly of the tower 110.

In one embodiment, a lower section of the tower 110 and a tower base are mated. The central tower 110 can be lifted off the ground with temporary supports such that fore floats (e.g., first and fourth outer columns 850A, 850D) can be connected underneath. For example, the two fore floats can be connected to the central column 840 (e.g., via a pin bearing). The two aft floats (e.g., second and third outer columns 850B, 850C) can be connected to the central column 840 (e.g., via a pin bearing). Remaining sections of the tower, such as the nacelle, rotor, and the like can be attached to the tower shaft 112.

Such a full or substantially complete floating wind turbine 100 can have the tower 110 in a horizontal or near horizontal configuration while being assembled and/or during a portion of a journey from a port or shoreline to a desired location where the floating wind turbine 100 is to be installed. In one embodiment, the turbine can be mated with the tower base in the horizontal position. Such an embodiment can use smaller, more readily available cranes to lift the tower sections, nacelle and blades (e.g., a gantry crane). Before, during, or just after the turbine installation, solid ballast can be added to the central or outer columns 840, 850 to lower the center of gravity of the structure. In one embodiment, the solid ballast can take the form of batteries.

In another embodiment, the platform is towed with the turbine in the horizontal position so that the drag on the turbine can be reduced. In one such an embodiment, the turbine upending can occur at the wind farm site. For example, when possible or desirable, the floating wind turbine 100 can be converted from the tower 110 being in the horizontal or near horizontal configuration to an erected configuration where the tower 110 is in a vertical or near vertical configuration, so it can be connected to a mooring and cabling system.

In some embodiments, once a turbine has been integrated onto tower 110, in various examples the floating wind turbine 100 can be towed from port. Many ports have draft or air draft restrictions as previously described. In one embodiment, the fully assembled floating wind turbine 100 can be transported on a barge. In another embodiment, the fully assembled floating wind turbine 100 can be skidded directly into the water (e.g., in a collapsed form such as shown in FIG. 10) and towed via tow lines 410. In another embodiment, the floating wind turbine 100 can be assembled in a dry dock, which can be filled with water after the assembly process is completed. Then, the assembled floating wind turbine 100 can be towed out of the port and to an offshore location (e.g., wind farm site), which in some examples can be via standard tug boats The floating wind turbine 100 can be transported in some examples by such vehicles as self-propelled modular transports, which are commonly used in port facilities. In this manner, the fully assembled floating wind turbine 100 can be loaded on to a barge for offshore transport.

In various embodiments, once the port obstructions, restrictions or shallow water have been cleared, the floating wind turbine 100 can be upended. For example, the floating wind turbine 100 can be towed out of port via tow lines 410 in the collapsed configuration as shown in FIG. 10 with ballast (e.g., water) absent or substantially absent from central or outer columns 840, 850.

The floating wind turbine 100 can be upended from a collapsed configuration (e.g., as shown in FIG. 10) by a first set of one or more columns 850 (e.g., first and fourth outer columns 850A, 850D) and/or the central column 840 being filled with ballast (e.g., water) to change the buoyancy of the first set of one or more columns 850 so that the first set of one or more columns 850 sink within the body of water 102 and reach an extended configuration (e.g., as shown in FIG. 11). In various embodiments such a configuration change can include the cross-beams 880 of the first set of one or more columns 850 translating along their respective upper tracks 810.

In various embodiments, such as shown in the example of FIG. 11 extension of the first set of one or more columns 850 can include the first set of one or more columns 850 going from being partially submerged in the water 102 to being fully submerged within the water 102 and can include the central column 840 going from being partially submerged in the water 102 to being fully submerged within the water 102.

In various embodiments, a second set of one or more columns 850 (e.g., second and third columns 850B, 850C) can move from a collapsed configuration (e.g., as shown in FIG. 10) to an extended configuration (e.g., as shown in FIG. 11). For example, the buoyancy of the second set of one or more columns 850 can cause cross-beams 880 of the second set of one or more columns 850 to translate along the lower tracks 820 and reach an extend position, as depicted in FIG. 11. In some embodiments, the second set of one or more columns 850 can remain floating on the surface 101 of the body of water 102 with a portion of the second set of one or more columns 850 disposed in the water 102 and a portion of the second set of one or more columns 850 remaining out of the water throughout the transition of the second set of one or more columns 850 from the collapsed configuration to the extended configuration.

In some embodiments, extension of the first set of one or more columns 850 and extension of the second set of one or more columns 850 can occur simultaneously or can occur sequentially in any suitable order. In some embodiments, sinking of the first set of one or more columns 850 and central column 840 into the body of water 102 can cause extension of the second set of one or more columns 850 based on the second set of one or more columns 850 remaining floating on the surface 101 of the body of water 102 based on the buoyancy of the second set of one or more columns 850.

The floating wind turbine 100 can be upended in various embodiments to an erected configuration by removing ballast from the first set of one or more columns 850 and/or central column 840. Additionally, in some examples, the second set of one or more columns 850 can be at least partially filled with ballast during such an upending. Such a change in ballast of the first and/or second sets of one or more columns 850 can generate an uprighting moment, which can cause the floating wind turbine 100 to upright from a configuration as shown in FIG. 11 and reach an operational erected configuration such as shown in FIG. 8.

In some embodiments, the first and second sets of one or more columns 850 can be filled with the same amount of ballast to generate equal buoyancy of the first and second sets of one or more columns 850 or the ballast of the first and second sets of one or more columns 850 can otherwise be configured to generate equal buoyancy of the first and second sets of one or more columns 850 (e.g., different amounts of ballast for columns having different weight).

While various examples of a floating wind turbine 100 can include four outer columns 850A, 850B, 850C, 850D, further embodiments can include any suitable number of columns 850 as discussed herein, including 1, 2, 3, 4, 5, 6, 7, 8, 9, 10, 12, 16, 25, 100, and the like. For example, FIG. 12 illustrates an example embodiment of a floating wind turbine 100 having three outer columns 850A, 850B, 850C.

In this example, the three outer columns 850A, 850B, 850C are shown equally spaced about the central column 840 with respective adjacent outer columns 850 being 1200 from each other about the central axis Y, which can define three planes of symmetry that are coincident with the central axis Y. It should be clear that descriptions of embodiments having four outer columns 850 can be equally applicable to embodiments having other numbers of outer columns 850 (e.g., three) in accordance with some examples.

Figure 12:
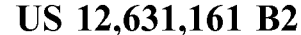
FIG. 12 illustrates another example embodiment of a floating wind turbine that has three outer columns.

Additionally, an embodiment 100D of a floating wind turbine 100 having three outer columns 850A, 850B, 850C such as shown in FIG. 12 (or other number of outer columns 850) can fold or otherwise assume a collapsed, expanded and/or erected configuration as discussed in other example embodiments herein. Using FIG. 12 as an example, one or two columns 850 of the three outer columns 850A, 850B, 850C can be configured to fold upward (e.g., like first and fourth columns 850A, 850D shown in FIG. 10) and one or two other columns 850 of the three outer columns 850A, 850B, 850C can be configured to fold downward (e.g., like second and third columns 850B, 850C shown in FIG. 10). Similarly, introduction and/or removal of ballast from respective columns 850 can cause fore and aft sets of one or more columns 850 to extend and/or contract and to cause the floating wind turbine 100 to be upended or lowered as discussed herein. Outer columns 850 can be configured to move via tracks 810, 820 as discussed herein or such tracks 810, 820 can be absent. In some such embodiments where tracks 810, 820 are absent, the stiffness of the upper and/or lower truss members 860, 870 can keep the column 850 aligned during the unfolding process. In some examples, the end of a cross-beam 880 can be attached to a winch line that guides the cross-beam 880 into a final position in a controlled manner. Once the cross-beam 880 reaches a final position, a pin can be inserted into the cross-beam 880 to lock the cross-beam 880 into place.

Also, as shown in the example of FIG. 12, the floating wind turbine 100 can comprise various access elements 890, which can include one or more ladders 892, one or more outer column platforms 894, one or more walkways 896 and one or more central column platform 898, and the like. For example, when the floating wind turbine 100 is floating in a body of water 102, a boat or ship can dock with the floating wind turbine 100 and a human operator can climb a ladder 892 on one of the outer columns 850 to the outer column platform 894, across the walkway 896 and to the central column platform 898. In various examples, the tower 110 can house elements of the floating wind turbine 100 that can be accessed by the human operator for purposes of maintenance, repair, or the like. Additionally, in various examples, there can be a ladder within the tower body 112, which allows an operator to climb up to the nacelle 170 for purposes of maintenance, repair, or the like, of elements of the turbine 700.

Additionally, while various embodiments can include a plurality of outer columns 850 radiating from a central column 840, further embodiments can include columns 840, 850 in any suitable configuration with a central column 840 being absent in some embodiments. For example, a set of outer columns 850 can be disposed in a triangular, quadrilateral, pentagonal, hexagonal, heptagonal, octagonal arrangement, or the like, with a central column being absent. Additionally, while various embodiments illustrated herein include a tower 110 extending from a central column 840, in further embodiments, one or more towers 110 can extend from one or more outer columns 850, including in some embodiments where a central column 840 is present.

One embodiment comprises, consists essentially of, or consists of a downwind and/or upwind floating wind turbine 100 with a turbine control system that can be used to optimize the tilt angle of the floating wind turbine 100 or portions thereof. Another embodiment comprises, consists essentially of, or consists of a downwind and/or upwind floating wind turbine 100 with a teetered hub, and a turbine control system that can be used to optimize the teeter angle of the rotor and the tilt angle of the floating wind turbine 100 or portions thereof.

In some such embodiments, no active control system exists on the floating wind platform, as the floating wind turbine 100 can be allowed to passively pitch in the direction of the wind. However, in various examples, the wind turbine 700 is able to produce full power, as a rotor plane of the floating wind turbine 100 can remain aligned with the horizontal.

Turning to FIGS. 13*a*, 13*b*, 14*a*, 14*b* and 15, various embodiments of a floating wind turbine 100 are illustrated that comprise a tower 110 disposed on a hull assembly 830 with a wind turbine 700 disposed on the top of the tower body 112 of the tower 110. The wind turbine 700 comprises a nacelle 170 with a hub 172 and a plurality of blades 174 extending from the hub 172. The 110 tower can have a central axis Y. The hub 172 and blades 174 can rotate about a rotor axis R, with the blades 174 having a blade plane B that is perpendicular to the rotor axis R.

In various embodiments, the hub 172 and corresponding rotor axis R can have a rotor tilt angle defined by a difference between the rotor axis R and a horizontal axis H (i.e., an axis perpendicular to gravity) when the central axis Y of the tower 110 is completely vertical (i.e., the central axis Y is parallel with an axis of gravity). For example, FIG. 13*a* illustrates an example where the central axis Y of the tower 110 is at a heel angle of 0° (i.e., the central axis Y is parallel with an axis of gravity), and the horizontal axis H is perpendicular to the central axis Y of the tower 110. The rotor axis R in this example is 5° from the horizontal axis H, which defines the rotor tilt angle of the example of FIG. 13*a* as being 5°. In some embodiments, rotor tilt angle can be defined based on a difference in angle between the central axis Y and blade plane B.

Turning to FIG. 13*b*, the floating wind turbine 100 of FIG. 13*a* is shown having a heel angle of 10° (i.e., the central axis Y of the tower 110 is 10° from true vertical as shown in FIG. 13*a*). Here, the heel angle of 10° plus the rotor tilt angle of 5° means that the rotor axis R is 15° from the horizontal axis H in this example. In various embodiments, having the rotor axis R parallel with the horizontal axis H (e.g., 0° misalignment) can be considered to be an optimal configuration for a wind turbine 700 (e.g., because such a configuration can maximize the swept area by the blades 174); accordingly, in such embodiments, the rotor axis R being 15° from the horizontal axis H can be considered a 150 misalignment of the rotor axis R from an optimal configuration.

However, in further embodiments, any suitable axis can be defined as an optimal axis for the rotor axis R, which can be based on wind direction, wind angle, or the like. In some examples, such an optimal axis for the rotor axis R can change based on changing environmental conditions (e.g., changing wind direction, wind angle, or the like) or can remain the same even if environmental conditions change.

In various embodiments, such misalignment of the rotor axis R can be desirable or acceptable for various reasons, but may come at the cost of reduced energy production; for example, a reduction in Annual Energy Production (AEP), or the like. In some embodiments, a reduction in AEP can be considered acceptable or can be unacceptable. For example, in some embodiments, a reduction in AEP of less than or equal to 0.1%, 0.2%, 0.3%, 0.4%, 0.5%, 0.6%, 0.7%, 0.8%, 1%, 1.5%, 2%, 2.5%, 3%, 3.5%, 4%, or the like can be considered acceptable. in some embodiments, a reduction in AEP of greater than or equal to 1%, 1.5%, 2%, 2.5%, 3%, 3.1%, 3.2%, 3.3%, 3.4%, 3.5%, 4%, 4.5%, 5% or the like can be considered unacceptable. Accordingly, various embodiments of a floating wind turbine 100 can be configured to operate at mean heel angle with a rotor tilt angle that generates a rotor misalignment that creates a reduced energy production compared to optimal (e.g., reduced AEP) that is considered acceptable or that is not considered unacceptable.

A floating wind turbine 100 of some various embodiments includes a downwind turbine 700, where the rotor is oriented 4° to 8° upward from the horizontal H in order to increase the clearance between the blade tips and tower shaft 112 in operation. The floating wind turbine 100 in various examples produces a thrust force in order to produce power from the wind. The thrust force can result in an overturning moment of floating wind turbine 100, which can cause the floating wind turbine 100 to have a mean heel angle. In some examples, a mean heel angle can be the mean pitch angle of the floating wind turbine 100, in the direction of the wind. In some embodiments, the mean heel angle can be 0°, 1°, 2°, 3°, 4°, 5°, 6°, 7° 8°, 9° 10°, 11°, 12°, 13°, 14°, 15°, 16°, 17°, 18°, 19°, 20°, or the like, or a range between such example values.

In some examples of a floating wind turbine 100, the target design heel angle is the heel angle of the platform when it is subject to the rated thrust force of the turbine. Rated thrust force can be the maximum mean thrust force on the turbine during operation. The design heel angle of a platform can depend on the platform's hydrostatic stiffness, which can be a function of its center of gravity and buoyancy, its waterplane moment area of inertia and the restoring force due to a mooring system. In some examples, increasing the floating wind turbine 100 hydrostatic stiffness can result in increased cost or complexity of the system, or both. For instance, for some semi-submersible floating wind turbines 100, the hydrostatic stiffness can be increased by increasing the spacing of the columns 840, 850, increasing the size of the columns 840, 850, or both.

Floating wind turbines 100 of some embodiments without active control systems, can target a design heel angle of 4-5 degrees, so that that the maximum rotor misalignment is 8-13 degrees from the horizontal axis H. Some floating wind turbines 100, with active platform control systems, can target a design heel angle of 5-8 degrees, so that that the tower 110 can remain vertical and the maximum rotor misalignment can be maintained at 4-8 degrees. Some wind turbines can have larger active control systems which can cause an increased tilt angle, resulting in 0 degrees rotor misalignment. In some embodiments, a floating wind turbine can be configured to operate with a rotor misalignment of −20°, −19°, −18°, −17°, −16°, −15°, −14°, −13°, −12°, −11°−10°, −9, −8°, −7°, −6°, −5°, −4°, −3°, −2°, −1°, 0°, 1°, 2°, 3° 4°, 5°, 6°, 7° 8°, 9° 10°, 11°, 12°, 13°, 14°, 15°, 16°, 17°, 18°, 19°, 20°, or the like, or a range between such example values.

In various embodiments, a benefit of a tilting floating wind turbine 100 operating at a tilt angle can be that a wake generated by the floating wind turbine 100 can be driven into the body of water 102 and can have a reduced effect on the downstream floating wind turbine 100 where a plurality of floating wind turbines 100 are disposed in an array, group or farm. In various embodiments, this can allow more floating wind turbines 100 to be grouped into in a given area, which can be desirable for operators of floating wind turbines 100.

In various embodiments, the design heel angle of the floating wind turbine 100 can be increased to 10–15 degrees, which in some examples can allow for a much smaller floating wind turbine 100 and/or less complex mooring system, or the like. In some embodiments, if the rotor tilt angle is 5 degrees above the horizontal axis H, the floating wind turbine 100 can heel under the influence of the rated thrust on the floating wind turbine 100. If the design heel angle of the turbine is 10 degrees, in various embodiments the rotor misalignment is only 5 degrees below the horizontal, which can be the same magnitude of misalignment as a conventional wind turbine with 0 degrees heel angle (e.g., oriented vertically).

While various examples can include a rotor tilt angle of 5°, various other rotor tilt angles can be defined in further embodiments including −10°, −9°–8°–7°–6°, −5°, −4°, −3°, −2°, −1°, 0°, 1°, 2°, 3° 4°, 5°, 6°, 7° 8°, 9° 10°, or the like, including a range between such example values. In some embodiments, the rotor tilt angle can be defined by various portions of a wind turbine 700 such as the physical position of the nacelle 170, hub 172, and the like. In some embodiments, the rotor tilt angle can be fixed based on a physical configuration of the wind turbine 700 or can be changeable in some embodiments (e.g., motorized tilting of the nacelle 170 to change the rotor tilt angle).

In various embodiments, the floating wind turbine 100 can be configured to have or can be positioned to heel angle or operating angle (e.g., angle of the central axis Y relative to true vertical) based on weighting or balancing of the hull assembly 830 (e.g., based on amount of ballast in columns 840, 850), weights of various portions of the hull assembly 830, tower 110 and/or wind turbine 700, anticipated or actual wind speed and/or direction, and the like. For example, in various embodiments, wind force on the floating wind turbine 100 can cause the floating wind turbine to be angled. Additionally, in various examples, wind, waves or tidal action of a body of water 102 can cause the floating wind turbine 100 to rock or otherwise move within the body of water 102. Accordingly, the floating wind turbine 100 can be configured to operate within a range of heel angles. For example, in some embodiments, the floating wind turbine 100 can be configured to be angled −20°, −19°, −18°, −17°, −16°, −15°, −14°, −13°, −12°, −11°, −10°, −9°, −8°, −7°, −6°, 5°–4°–3°, −2°–1°, 0°, 1°, 2°, 3° 4° 5° 6°, 7° 8°, 9° 10°, 11°, 12°, 13°, 14°, 15°, 16°, 17°, 18°, 19°, 20°, or the like, or a range between such example values.

Additionally, a floating wind turbine 100 can be configured for upwind and/or downwind operation. An example of upwind operation is illustrated in FIGS. 13a and 13b where the direction of wind is toward the front face of the hub 172 and blades 174 and then moving over the nacelle 170. In contrast, FIGS. 14a, 14b and 15 illustrate examples of downwind operation where the direction of wind is toward the rear face of the hub 172 and blades 174 with wind directed toward the rear of the nacelle 170.

Figures 14A, 14B:
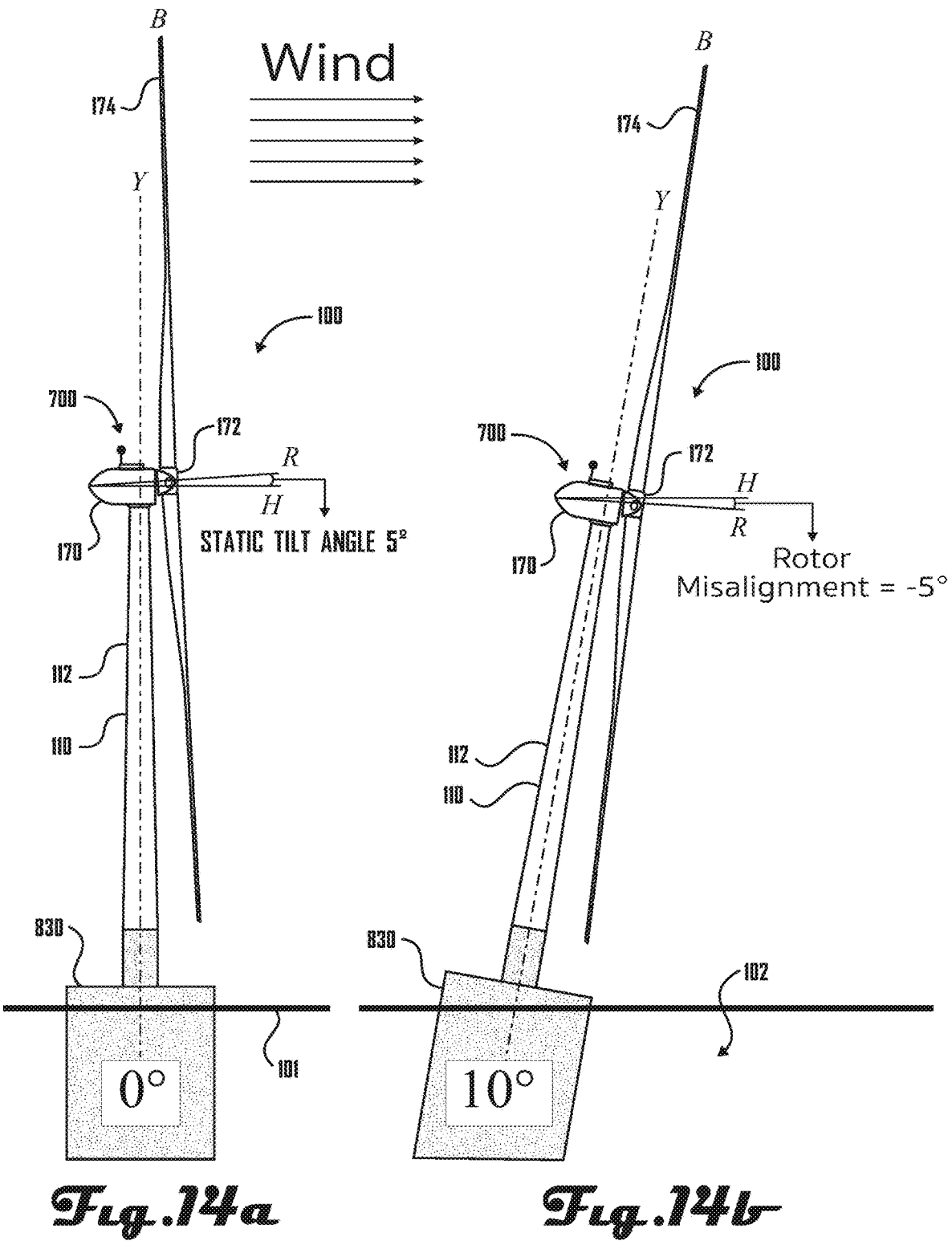
FIG. 14a illustrates an example of a downwind floating wind turbine where the central axis Y of the tower is at a heel angle of 0° with a rotor tilt angle of 5°.
FIG. 14b illustrates the downwind floating wind turbine of FIG. 14a at a heel angle of 10°.
Figure 15:
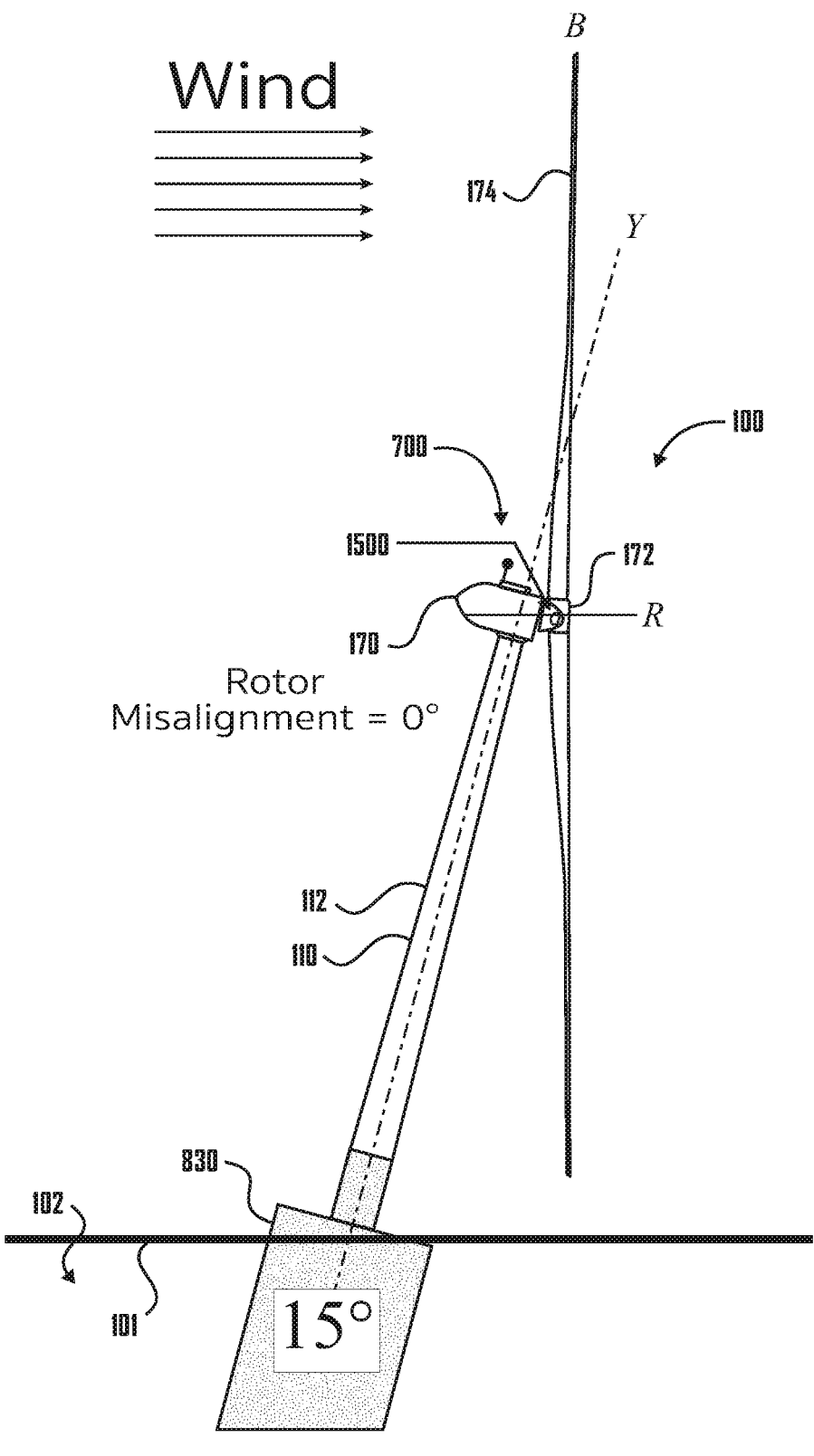
FIG. 15 illustrates an example of a downwind floating wind turbine with a teetering rotor.
Figures 17A, 17B:
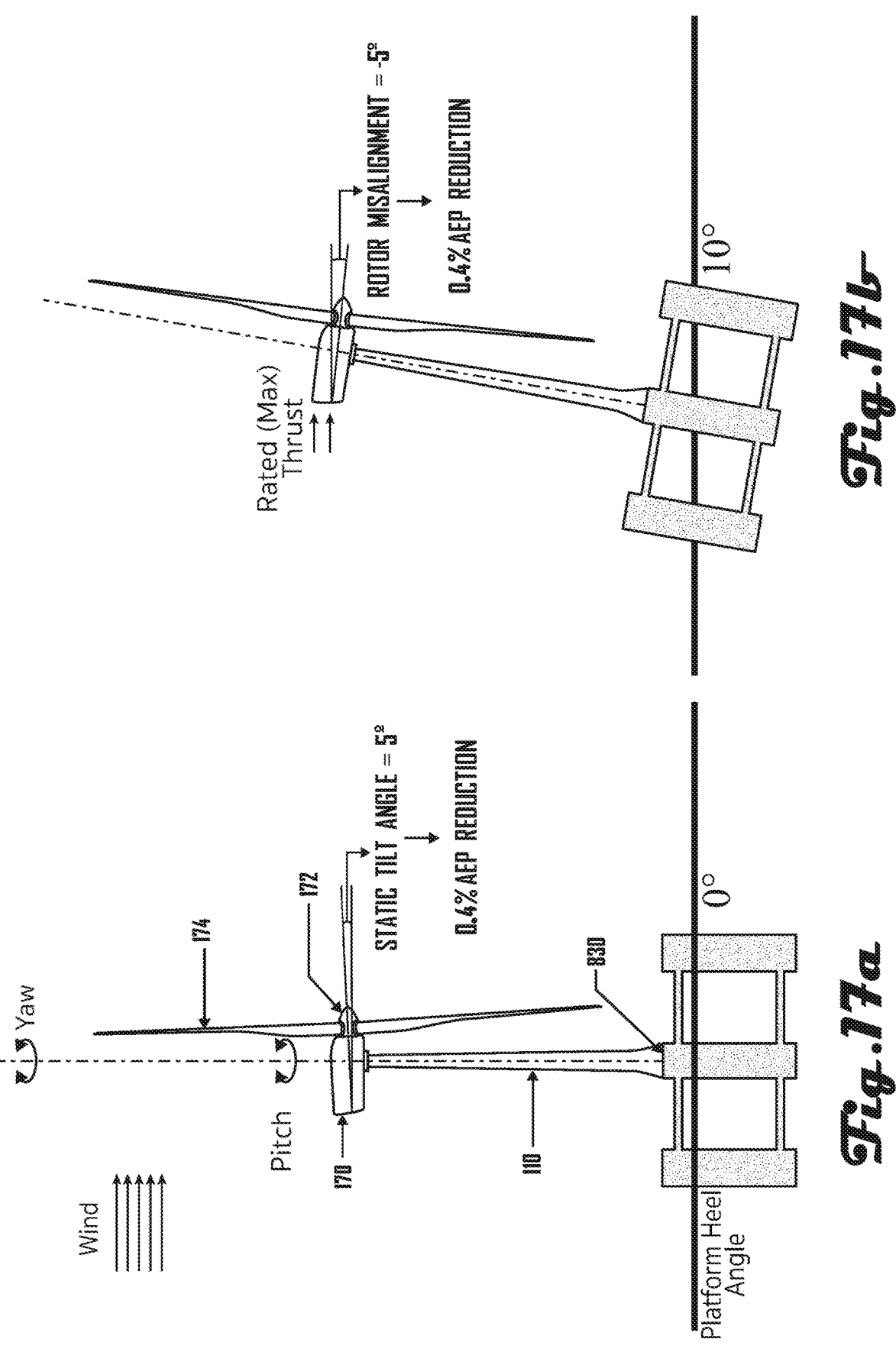
FIG. 17a illustrates an example embodiment of a downwind floating wind turbine under static conditions with a static tilt angle of 5° and a heel angle of 0° which in this example causes an Annual Energy Production (AEP) reduction of 0.4% compared to a tilt angle of 0°.
FIG. 17b illustrates an example embodiment of a passive downwind floating wind turbine under rated thrust conditions with a static tilt angle of 5° at a heel angle of 100 that causes a rotor misalignment of −5°, which in this example causes an AEP reduction of 0.4% compared to a rotor misalignment of 0°.

For example, FIGS. 14a and 14b illustrate an example where the rotor plane R is 5° away from the perpendicular to the shaft axis Y to define a rotor tilt angle of 5°. As shown in FIG. 14b, where the floating wind turbine becomes angled 10° (e.g., based on wind, balance, or the like), this can cause the rotor axis R to be −5° from the horizontal axis H. In another embodiment the design heel angle can be 20 degrees, with 10 degrees of misalignment between the rotor plane R and the shaft axis Y.

In some examples, a downwind, teetering floating wind turbine 100 of various embodiments can afford the platform designer with even a larger design heel angle, while still maintaining 0 degrees of rotor misalignment. In some examples of a teetered floating wind turbine 100, the rotor axis R can be misaligned from an angle that is perpendicular to the main shaft axis Y. For example, FIG. 15 illustrates such an example. The platform can have a 15° design heel angle as shown in this example, but has 0 degrees of rotor misalignment with the incident wind due to the additive effects of the downwind turbine and a teetered hub 1500 that allows for movement of the hub relative to the rotor axis R. In this way, in various examples the cost and complexity of the platform and mooring system can be decreased even further from using a fixed hub, downwind wind turbine.

In various embodiments, a floating wind turbine 100 can have various suitable control systems such as blade pitch controllers, nacelle yaw control, generator torque control, and the like. In various embodiments, a floating wind turbine 100 can comprise a computing system comprising a processor and memory that stores instructions, that when executed by the processor, cause various methods to be performed. In various embodiments, such a computing system can obtain data from various suitable sensors such as one or more accelerometer, temperature sensor, water sensor, humidity sensor, magnetic field sensor, gyroscope, pressure sensor, torque sensor, light sensor, rain gauge, wind sensor, current sensor, depth sensor, GPS unit and the like. For example, sensor data from such sensors can be used to determine position, tilt angle, orientation, velocity, power generation, turbine speed, depth within a body of water, and other states or configurations of the floating wind turbine 100. Additionally, in some examples, sensor data from such sensors can be used to determine environmental conditions such as air temperature, water temperature, water salinity, wind speed, wind direction, wave height, wave direction, precipitation, and the like. Various examples can include systems and methods to control the blade pitch of the blades 174 to optimize power production from a floating wind turbine 100.

As a floating wind turbine 100 is subject to dynamic wave loads, in various embodiments the floating wind turbine 100 can undergo dynamic pitch motion. The magnitude of the pitch motion of the floating wind turbine 100 can be related to the magnitude of the variation in these environmental forces, as well the characteristics of the floating wind turbine 100, such as its pitch stiffness, damping and the like. In some embodiments, the floating wind turbine 100 can exhibit dynamic pitch motion up to 5° in amplitude. For example, for a floating wind turbine 100 with a design mean heel angle of 15 degrees, the platform could pitch from 10-20 degrees away from the vertical. As the floating wind turbine 100 is pitching back and forth, the relative wind velocity on the blades 174 can change. If the blade pitch is not adjusted, in some examples this could lead to unstable behavior of the floating wind turbine 100.

In some examples, the power absorbed by the generator can be proportional to the relative velocity on the rotor to the power of 3. If we approximate the sinusoidal motion of the platform as a step curve, so that the relative velocity is either increased or decreased by a constant value VV, in various embodiments we are able to increase the power produced over one cycle. Mathematically, the power generated by a fixed turbine can be proportional to the cube of the incident wind speed $V_\infty$:

$$P_\infty \propto V_\infty^3$$

Mathematically, the power generated by a wind turbine that is rocking back and forth can be proportional to the cube of the relative wind speed $V_{rel}$ between the turbine and the wind:

27

28

$$P_{enh} \propto V_{rel}^3 = 0.5*(V_\infty - \nabla V)^3 + 0.5*(V_\infty + \nabla V)^3 = P_\infty + 3V_\infty \nabla V^2$$

The power enhanced can be proportional to $\nabla V^2$ which can be the square of the pitch velocity of the platform multiplied by the hub height. In some examples, the instantaneous power enhancement is small. However, over the lifetime of the floating wind turbine 100, the power enhanced can be significant.

In order to achieve this power enhancement in various embodiments, the thrust force absorbed by the floating wind turbine 100 must remain relatively constant over one pitching cycle of the floating wind turbine 100. Natural periods in pitch for a floating wind turbine 100 can be generally 20-30 s in some examples.

One embodiment of a wind turbine controller method 1600 is depicted in FIG. 16. The purpose of the controller can be to determine the velocity of the rotor relative to the incident wind, by measuring or determining the positions, velocities and accelerations of the floating wind turbine 100 as well as the incident wind speed and direction. Then, blade pitch controllers can be actuated to ensure that the thrust on the rotor remains relatively constant.

An ancillary benefit of such wind turbine control system in various embodiments is that the amplitude of the variation of thrust force can be minimized, resulting in reduced fatigue damage on the turbine 700 and hull assembly 830, and the like. The variation in the thrust force can result in a bending moment on the base of the tower 110, which can be transferred to the hull assembly 830. By reducing the variation in the amplitude of the thrust force, in various examples the fatigue damage accrued on the floating wind turbine 100 is reduced.

For example, referring to FIG. 16, at 1610, position and/or orientation of the floating wind turbine 100 is measured or determined, which can include pitch, roll and yaw motions along with velocities, accelerations, and the like. In various examples such measurements or determinations can be based on sensor data obtained from sensors as discussed herein. At 1620, incident wind speed, incident wind direction, and the like, are measured or determined, which can be based on sensor data obtained from sensors as discussed herein.

At 1630, rotational motion, velocity and acceleration in line with wind direction can be determined, and at 1640, rotational motion, velocity and acceleration in line with wind direction over a time horizon (e.g., 20-30 seconds) can be predicted or determined. At 1650, a determination can be made for blade pitch angle(s) to minimize thrust variation and/or maximize power production over the controller time horizon, and at 1660, a blade pitch system can be actuated to change the configuration of one or more blades 174 in accordance with the determination at 1650.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives. Additionally, elements of a given embodiment should not be construed to be applicable to only that example embodiment and therefore elements of one example embodiment can be applicable to other embodiments. Additionally, elements that are specifically shown in example embodiments should be construed to cover embodiments that comprise, consist essentially of, or consist of such elements, or such elements can be explicitly absent from further embodiments. Accordingly, the recitation of an element being present in one example should be construed to support some embodiments where such an element is explicitly absent. Additionally, use of the term "floating," or the like, should not be construed to indicate that a given element or system is currently floating and instead that such an element is configured, configurable or capable of floating in a fluid.

What is claimed is:

1. A method of operating a downwind floating platform, the method comprising:

providing the downwind floating platform, the downwind floating platform including a tower, a turbine, and a hull assembly, the downwind floating platform disposed to be floating in a body of water, the tower having a central axis Y and including a turbine, the turbine including a nacelle, a hub and a plurality of blades, the plurality of blades extending from the hub, the plurality of blades configured to rotate about a rotor axis R, the plurality of blades having a blade plane B that is perpendicular to the rotor axis R, the plurality of the blades coupled with an actuator, wherein a static tilt angle is defined by an angle of rotor axis R relative to a perpendicular axis to the central axis Y, the static tilt angle being between 3° and 7° and the rotor axis R has a misalignment of between 3° and 7° with respect to the central axis Y, and the hull assembly including:

a central column coupled to a base of the tower at a top of the central column, the central column having a central column axis coincident with the central axis Y, a plurality of at least three outer columns including a first outer column, a second outer column and a third outer column, the plurality of at least three outer columns surrounding and equally spaced about the central column about the central axis Y;

a plurality of upper truss members, including at least a first upper truss member, a second upper truss member and a third upper truss member that respectively couple the first, second and third outer columns with the central column;

a plurality of lower truss members including at least a first lower truss member, a second lower truss member and a third lower truss member that respectively couple the first, second and third outer columns with the central column; and a plurality of cross-beams, including at least a first-cross beam, a second cross-beam and a third cross-beam, that respectively couple and extend diagonally between the first, second and third outer columns and the central column;

adjusting, by a blade pitch system, using the actuator, one or more blade pitch angles of the plurality of blades, thereby causing the downwind floating platform to assume a mean heel angle of equal to or between 5° and 15° defined by a mean pitch angle of the central axis Y of the tower of the downwind floating platform in a direction of wind, the downwind floating platform assuming the mean heel angle from a force generated by the wind; and operating the downwind floating platform with a maximum rotor misalignment between +1° and −10° from a horizontal axis that is perpendicular to gravity while assuming the mean heel angle of equal to or between 5° and 15°;

wherein the downwind floating wind platform is configured to passively float in the body of water without being coupled to a floor of the body of water, and wherein the tower extends vertically above a surface of the body of water with the three outer columns and the central column partially submerged in the body of water, with the downwind floating platform floating in the body of water at least based on buoyancy of the three outer columns and the central column.

2. The method of claim 1, wherein the downwind floating platform is configured to operate as a teetering downwind floating platform and the hub is a teetered hub that allows a rotor tilt angle to be changed.

3. The method of claim 1, wherein the central column and the at least three outer columns are configured to be filled with water that acts as a ballast for the hull assembly.

4. The method of claim 1, further comprising:

measuring, by a first sensor, an orientation of the downwind floating platform, the orientation including position, velocity, and acceleration in pitch, roll, and yaw;

measuring, by a second sensor, incident wind speed and an incident wind direction; and determining a prediction of rotational movement of the downwind floating platform based on the orientation, the incident wind speed, and the incident wind direction, the prediction of rotational movement including rotational motion, rotational velocity, and rotational acceleration; and adjusting the one or more blade pitch angles based on the prediction of rotational movement.

5. A method of operating a downwind floating platform, the method comprising:

providing the downwind floating platform, the downwind floating platform including a tower, a turbine, and a hull assembly, the downwind floating platform disposed to be floating in a body of water, the tower having a central axis Y and including a turbine, the turbine including a nacelle, a hub and a plurality of blades, the plurality of blades extending from the hub, the plurality of blades configured to rotate about a rotor axis R, the plurality of blades having a blade plane B that is perpendicular to the rotor axis R, the plurality of the blades coupled with an actuator, wherein a static tilt angle is defined by an angle of rotor axis R relative to a perpendicular axis to the central axis Y, the static tilt angle is defined as being between 3° and 7° and the rotor axis R has a misalignment of between 3° and 7° with respect to the central axis Y;

adjusting, by a blade pitch system, using the actuator, one or more blade pitch angles of the plurality of blades, thereby causing the downwind floating platform to assume a mean heel angle of equal to or between 5° and 15° defined by a mean pitch angle of the central axis Y of the tower of the downwind floating platform in a direction of wind, the downwind floating platform assuming the mean heel angle from a force generated by the wind; and operating the downwind floating platform with a maximum rotor misalignment between +1° and −10° from a horizontal axis that is perpendicular to gravity while assuming the mean heel angle of equal to or between 5° and 15°.

6. The method of claim 5, the method further comprising:

providing a downwind floating platform which comprises:

a hull assembly, the hull assembly including:

a central column coupled to a base of the tower at a top of the central column, the central column having a central column axis coincident with the central axis Y, a plurality of at least three outer columns including a first outer column, a second outer column and a third outer column, the plurality of at least three outer columns surrounding and equally spaced about the central column about the central axis Y;

a plurality of upper truss members, including at least a first upper truss member, a second upper truss member and a third upper truss member that respectively couple the first, second and third outer columns with the central column; and a plurality of lower truss members including at least a first lower truss member, a second lower truss member and a third lower truss member that respectively couple the first, second and third outer columns with the central column.

7. The method of claim 5, wherein the downwind floating platform is configured to assume an upright configuration floating in the body of water, on a surface of the body of water without being coupled to a floor of the body of water, where in the upright configuration, the tower extends vertically above the surface of the body of water with a plurality of outer columns submerged in the body of water, with the downwind floating platform floating in the body of water at least based on buoyancy of the plurality of outer columns.

8. A method of operating a downwind floating platform, the method comprising:

providing the downwind floating platform, the downwind floating platform including a tower, a turbine, and a hull assembly, the downwind floating platform disposed to be floating in a body of water, the tower having a central axis Y and including a turbine, the turbine including a nacelle, a hub and a plurality of blades, the plurality of blades extending from the hub, the plurality of blades configured to rotate about a rotor axis R, the rotor axis R having rotor tilt angle defined by an angle of rotor axis R relative to a perpendicular axis to the central axis Y, the plurality of the blades coupled with an actuator;

adjusting, by a blade pitch system, using the actuator, one or more blade pitch angles of the plurality of blades, thereby causing the downwind floating platform to assume a mean heel angle within a range defined by a mean pitch angle of the central axis Y of the tower of the downwind floating platform in a direction of wind, wherein the downwind floating wind platform passively assumes the mean heel angle from a force generated by the wind; and operating the downwind floating platform with a maximum rotor misalignment from a horizontal axis that is perpendicular to gravity while assuming the mean heel angle.

9. The method of claim 8, wherein the maximum rotor misalignment between 1° and 13°.

10. The method of claim 8, wherein the rotor tilt angle is equal to or between 1° and 10°.

11. The method of claim 8, wherein the downwind floating platform comprises a hull assembly that includes a plurality of at least three outer columns including a first outer column, a second outer column and a third outer column.

12. The method of claim 8, wherein the downwind floating platform is configured to assume an upright configuration floating on a surface of the body of water, without being coupled to a floor of the body of water, where the tower extends vertically above the surface of the body of water with a plurality of columns submerged in the body of water, with the downwind floating wind platform floating in the body of water at least based on buoyancy of the plurality of columns.

13. The method of claim 8, wherein the mean heel angle is equal to or between 1° and 20°.

14. The method of claim 8, wherein the maximum rotor misalignment is between 2° and 20°.

15. The method of claim 8, wherein the rotor tilt angle is configured to be changed.

16. The method of claim 15, wherein the downwind floating platform is configured to operate as a teetering floating wind turbine and the hub is a teetered hub that allows the rotor tilt angle to be changed.

17. A method of operating a downwind floating platform, the method comprising:
    providing the downwind floating platform, the downwind floating platform including a tower, a turbine, and a hull assembly, the downwind floating platform disposed to be floating in a body of water,
    the tower having a central axis Y and including a turbine, the turbine including a nacelle, a hub and a plurality of blades,
    the plurality of blades extending from the hub, the plurality of blades configured to rotate about a rotor axis R, the plurality of blades having a blade plane B that is perpendicular to the rotor axis R, the plurality of the blades coupled with an actuator,
    wherein a static tilt angle is defined by an angle of rotor axis R relative to a perpendicular axis to the central axis Y, wherein the static tilt angle is between 3° and 7°, and the rotor axis R has a misalignment of between 3° and 7° with respect to the central axis Y;
    the hull assembly including a central column coupled to a base of the tower at a top of the central column, the central column having a central column axis coincident with the central axis Y;
    adjusting, by a blade pitch system, using the actuator, one or more blade pitch angles of the plurality of blades, thereby causing the downwind floating platform to assume a mean heel angle within a range defined by a mean pitch angle of the central axis Y of the tower of the downwind floating wind platform in a direction of wind, wherein the downwind floating wind platform passively assumes the mean heel angle from a force generated by the wind; and
    operating the downwind floating platform with a maximum rotor misalignment from a horizontal axis that is perpendicular to gravity while assuming the mean heel angle.

* * * * *